US007770969B2

(12) United States Patent
Boyle et al.

(10) Patent No.: US 7,770,969 B2
(45) Date of Patent: *Aug. 10, 2010

(54) VEHICLE SAFETY RESTRAINT SYSTEM

(75) Inventors: Donald C. Boyle, Indianapolis, IN (US);
Michael A. Wiseman, Avon, IN (US);
Thomas P. Woellert, Indianapolis, IN
(US); James T. Anthony, Noblesville,
IN (US)

(73) Assignee: Indiana Mills & Manufacturing, Inc.,
Westfield, IN (US)

( * ) Notice: Subject to any disclaimer, the term of this patent is extended or adjusted under 35 U.S.C. 154(b) by 74 days.

This patent is subject to a terminal disclaimer.

(21) Appl. No.: 12/030,399

(22) Filed: Feb. 13, 2008

(65) Prior Publication Data
US 2008/0203793 A1    Aug. 28, 2008

Related U.S. Application Data

(63) Continuation of application No. 10/574,519, filed as application No. PCT/US2004/033239 on Oct. 8, 2004, now Pat. No. 7,347,494.

(60) Provisional application No. 60/550,350, filed on Mar. 5, 2004, provisional application No. 60/539,399, filed on Jan. 27, 2004, provisional application No. 60/510,633, filed on Oct. 10, 2003.

(51) Int. Cl.
A47C 15/00 (2006.01)
B60N 2/26 (2006.01)
(52) U.S. Cl. .................. 297/254; 297/255; 297/484
(58) Field of Classification Search ............. 297/253, 297/254, 467, 486, 487
See application file for complete search history.

(56) References Cited

U.S. PATENT DOCUMENTS

| 3,083,054 A | * | 3/1963 | Weaver ............... 297/228.12 |
| 3,834,758 A | * | 9/1974 | Soule .................... 297/484 |
| 3,954,234 A | | 5/1976 | Frost et al. |
| 3,992,028 A | * | 11/1976 | Abe et al. ............. 280/728.1 |
| 4,362,334 A | | 12/1982 | Ross et al. |
| 4,488,691 A | | 12/1984 | Lorch |
| 4,660,889 A | | 4/1987 | Anthony et al. |
| 4,679,852 A | | 7/1987 | Anthony et al. |

(Continued)

FOREIGN PATENT DOCUMENTS

EP    650872 A1    5/1995

OTHER PUBLICATIONS

PCT International Search Report for PC/US2004/033239 completed by the US Searching Authority on Sep. 29, 2005.

*Primary Examiner*—Sarah B McPartlin
(74) *Attorney, Agent, or Firm*—Woodard, Emhardt, Moriarty, McNett & Henry LLP

(57) ABSTRACT

A vehicle safety restraint system comprises a portable base having a mounting assembly and a restraint assembly. The portable base may be a booster seat. The mounting assembly mounts the base the base to the seat of a vehicle and the restraint assembly restrains an occupant of the base. The mounting assembly may wrap around at least a portion of the vehicle seat to mount the booster seat to the vehicle. The restraint assembly may comprise a five-point or a four-point restraint and may include a lateral support assembly. The restraint assembly may further include a torso support assembly. A method of mounting a portable base to a vehicle seat is provided.

9 Claims, 13 Drawing Sheets

U.S. PATENT DOCUMENTS

| | | | |
|---|---|---|---|
| 4,874,203 A * | 10/1989 | Henley ................... 297/250.1 |
| 4,927,211 A | 5/1990 | Bolcerek |
| 5,056,869 A * | 10/1991 | Morrison .................... 297/485 |
| 5,121,965 A | 6/1992 | Skold et al. |
| 5,299,855 A * | 4/1994 | Zubeck ....................... 297/485 |
| D353,947 S * | 1/1995 | Gain ........................... D6/333 |
| 5,630,645 A | 5/1997 | Lumley et al. |
| 5,641,200 A | 6/1997 | Howell |
| 5,678,887 A | 10/1997 | Sher |
| 5,685,604 A | 11/1997 | Kain |
| 5,797,654 A | 8/1998 | Stroud |
| 5,829,834 A | 11/1998 | Silverman |
| 5,839,793 A | 11/1998 | Merrick et al. |
| 5,845,967 A | 12/1998 | Kane et al. |
| 5,873,635 A | 2/1999 | Merrick |
| 5,915,787 A | 6/1999 | Brookman |
| 5,971,492 A * | 10/1999 | Pitman ....................... 297/484 |
| 6,089,662 A | 7/2000 | Lambert et al. |
| 6,220,662 B1 | 4/2001 | Franco-Vila et al. |
| 6,254,184 B1 | 7/2001 | Kontos |
| 6,322,143 B2 | 11/2001 | Kassai et al. |
| 6,386,559 B1 * | 5/2002 | Souza ..................... 280/47.26 |
| 6,450,576 B1 | 9/2002 | Rhein et al. |
| 6,481,800 B2 | 11/2002 | Duncan |
| 6,485,098 B1 | 11/2002 | Vits et al. |
| 6,499,786 B2 | 12/2002 | Takahashi |
| 6,554,357 B2 * | 4/2003 | Moffa ........................ 297/253 |
| 6,601,804 B2 | 8/2003 | Bisch |
| 6,601,917 B1 | 8/2003 | Christopherson |
| 6,886,889 B2 | 5/2005 | Vits et al. |
| 6,962,394 B2 | 11/2005 | Anthony et al. |
| 2002/0017808 A1 | 2/2002 | Kain |
| 2002/0109381 A1 | 8/2002 | Duncan |
| 2003/0155797 A1 | 8/2003 | Amirault |
| 2003/0197415 A1 | 10/2003 | Dingman |
| 2004/0007910 A1 | 1/2004 | Skelly |

* cited by examiner

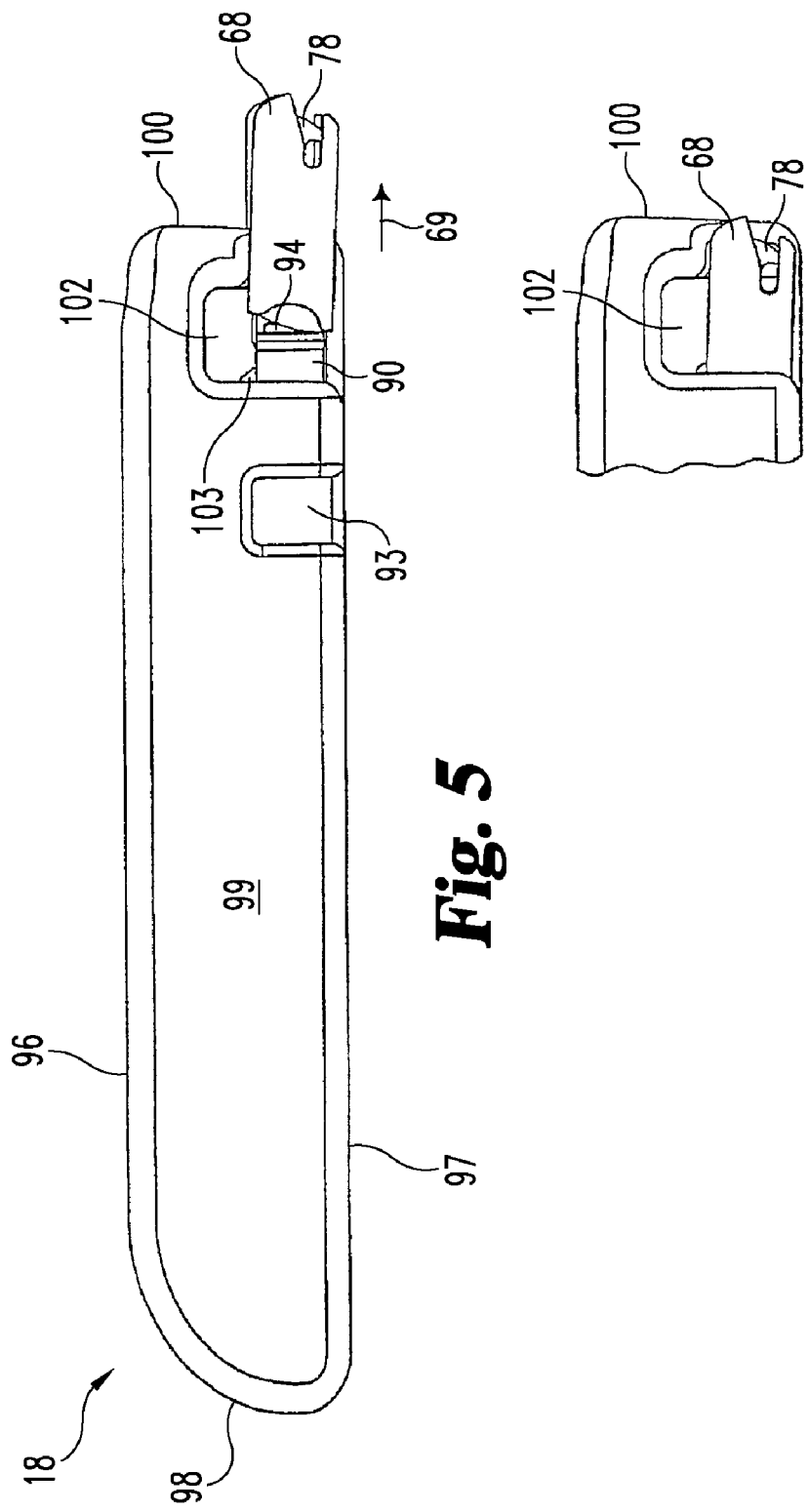

VEHICLE SAFETY RESTRAINT SYSTEM

REFERENCE TO RELATED APPLICATIONS

This is a continuation of our prior application, Ser. No. 10/574,519, filed on Apr. 3, 2006. This patent application claims priority to and the benefit of U.S. patent application Ser. No. 574,519, filed 3 Apr. 2006 which claims priority to and the benefit of U.S. Provisional Patent Application 60/510,633, filed 10 Oct. 2003; U.S. Provisional Patent Application No. 60/539,399, filed 27 Jan. 2004; and U.S. Provisional Patent Application No. 60/550,350, filed 5 Mar. 2004, the disclosures of each of which are now incorporated herein by reference.

BACKGROUND AND SUMMARY OF THE INVENTION

This disclosure relates generally to passenger restraint systems for use in vehicles, and more particularly, to portable add-on restraint systems.

Conventional vehicle restraint or seat belt systems combining a lap belt and an upper torso or shoulder belt to restrain an occupant or passenger in a vehicle are well known. These three-point restraint systems integral to the vehicle are usually used with seats offering rigid support for the belts. As typically used in a vehicle, the three-point restraint system consists of a single belt having its opposite ends mounted to a pair of retractors with a seat belt tongue connected to the belt intermediate to the belt ends. The tongue may be swung across the person and engaged with a buckle affixed to the seat thereby positioning one portion of the belt across the lap and another portion of the belt across the upper torso. In some systems, only one end of the belt is mounted to a retractor while the other end is anchored to the seat or vehicle. These seat belt systems are active restraint devices, generally requiring a passenger to positively engage the restraints about the person for them to be effective.

School bus passenger seats usually do not employ active restraint safety devices, but instead rely on a passive restraint seat design. School bus passenger seats are built to specifications conforming to the safety standards set by the National Highway Traffic Safety Administration, Department of Transportation (DOT). These are codified as 49 C.F.R. Ch.V, §571.222, Standard No. 222 (Federal Motor Vehicle Safety Standard (FMVSS) 222), and require that the seat back bend or deflect forward when a force is applied to the rear of the seat back. The code specifies a passive restraint system, and currently does not require any sort of active restraints, such as a two-point passenger restraining lap belt or the above-described three-point passenger restraining lap belt and torso harness combination. Rather, passengers riding the school bus are protected in head-on collisions by the seat back in front of them deflecting forward and absorbing some of their forward momentum.

Further passenger protection, from head-on and non-head-on collisions and roll events, may be provided by active restraint systems. One such active restraint system might be a two-point lap belt restraint. Vehicles, such as buses, which require the passive protection provided by deforming or deflecting seats, present certain challenges regarding the integration of active restraint seat belt systems. In a school bus seat combining active and passive restraint systems, both of the restraint systems may need to be able to perform their functions and the seat may still need to conform to the regulations set forth in FMVSS 222, which is incorporated herein by reference. In addition to two-point active lap restraint systems, examples of vehicle seats designed to combine both active and passive restraint systems in conformity with FMVSS 222 are found in commonly owned U.S. Pat. Nos. 6,485,098, and 6,886,889, the disclosures of which are now incorporated herein by reference.

Two-point lap belt systems, or these new three-point lap belt systems may allow the use of various add-on restraint systems on buses or other vehicles. For example, torso harnesses, positioning harnesses, portable child seats and booster seats. For example, portable child seats for infants and children up to about 50 pounds and booster seats for children between about 30 and about 70 pounds, may be mounted to a vehicle for restraint of a passenger or occupant. Commonly owned U.S. Pat. No. 6,886,889 discloses supplemental restraint systems for use with a school bus seat in accordance with FMVSS 222. Examples of booster seats are disclosed in U.S. Pat. No. 5,797,654 to Stroud, U.S. Pat. No. 5,829,834 to Silverman, and U.S. Pat. No. 5,685,604 to Kain, which are incorporated by reference herein.

These add-on child restraint systems may be coupled to a vehicle seat using various connectors and anchorage systems. The federal government has mandated that child restraint anchorage systems be installed in most vehicles, including cars, trucks, vans, sports utility vehicles (SUVs) and certain school buses. These regulations, codified at 49 C.F.R. §571.225 (FMVSS 225), incorporated herein by reference, require two lower anchorages and an upper tether anchorage of specified configuration, location and strength parameters. Similarly, 49 C.F.R. §571.213 (FMVSS 213), incorporated herein by reference, specifies the dimensions of tether hooks used to attach a tether strap to a tether anchorage. Yet, there are pre-existing seats in school buses that do not have active restraint systems of any kind, or which might benefit from additional restraint systems of some kind. Disclosed herein are add-on or supplemental vehicle restraint systems configured to wrap mount to vehicle seats without the use of any lower anchorages, any upper tether anchorages, or the use of any active restraint system integral to the seat. These supplemental restraint systems may, but need not be compatible with FMVSS 222. Also disclosed are add-on vehicle restraint systems configured to mount to vehicle seats using one or more lower anchorages and/or one or more upper tether anchorage, alone or in combination with each other and/or with the other mounting configurations disclosed herein. Such add-on systems include those for use by occupants with special physical or mental needs. Further disclosed herein are add-on vehicle restraint systems configured to mount to a vehicle using, alone or in combination with one or more lower and/or upper anchorage and/or a wrap mount system, the two-point and three-point restraint systems integral to the vehicle. In addition, an add-on vehicle restraint system configured for simultaneous use by more than one occupant or passenger is disclosed.

The present invention may comprise one or more of the features recited in the attached claims, and/or one or more of the following features and combinations thereof. An add-on restraint system or restraining device may be mounted to the vehicle seat of any of a number of vehicles such as cars, school buses, tour buses, vans, SUVs, recreational vehicles (RVs), air planes, watercraft, and other vehicles or modes of conveyance, such as for example ski lifts, without limitation. The illustrative restraint system comprises a base such as for example a booster seat, a mounting assembly coupled or attached to the base and configured to mount the booster seat to the vehicle seat, and a restraint assembly coupled or attached to the base and configured to restrain a passenger positioned on the booster seat. The mounting assembly and the restraint assembly may be coupled or associated with one another. The booster seat may be configured to accommodate an occupant or passenger weighing between about 30 and 90 pounds. In one embodiment the mounting assembly comprises one or more flexible members that wrap around at least a portion of the back of the vehicle seat. In another embodiment, connecters attached or coupled to the booster seat may engage anchorages attached to the vehicle to mount the booster seat to the vehicle. In another embodiment, the booster seat may be configured to mount to the vehicle seat by receiving the vehicles's integrated seat belt system. In other embodiments, one or more of the above means of mounting the booster seat to the vehicle seat may be combined. For example the booster seat may be wrap-mounted and rigidly mounted using a connector attached to the booster seat, and or mounted using the vehicle's integrated seat belt system.

Thus, in another embodiment, this invention comprises an anchorage-mounted restraint system for use on seats found in such vehicles as for example cars, school buses, tour buses, vans, SUVs, RVs, air planes, watercraft, and other vehicles or modes of conveyance, without limitation. This restraining device may also comprise a mounting assembly, a booster seat, and a restraint assembly.

In yet another embodiment, this invention comprises a combination wrap-mounted and anchorage-mounted restraint system or restraining device and method of using same for use on seats found in such vehicles as for example cars, school buses, tour buses, vans, SUVs, RVs, air planes, watercraft, and other vehicles or modes of conveyance, such as for example ski lifts, without limitation. The restraint system may comprise a mounting assembly, a booster seat or base, and a restraint assembly.

The mounting assembly may comprise in any combination webs and connectors. The restraint assembly may comprise any combination of flexible, semi-flexible, rigid or semi-rigid restraint members such as for example webs, and associated tongues, buckles, and web adjusters. The restraint assembly may further comprise a torso support assembly. The restraint system or device may further comprise a lateral support assembly. The lateral support assembly may be positioned as desired. A positioning member may help to position the mounting assembly on the vehicle seat. The restraint system or device may collapse into a carrying case provided by the base, which may be equipped with a handle or other device configured to allow gripping and carrying of the system. The restraint system may be configured to restrain two or more occupants by providing a plurality of booster seats, mounting assemblies and restraint assemblies in combination. The plurality of booster seats may be rigidly connected when mounted to the vehicle seat. A cover may be provided to cover portions of the restraint system.

Also provided is a method of mounting an occupant restraint system to a vehicle seat comprising a back portion having a front and back surface and a seat portion having a top and bottom surface, with the back and seat portions defining a bight therebetween, comprising the steps of:

passing a first opposing end of a web over at least a portion of the top of the vehicle seat and down at least a portion of the front surface of the back portion;

passing a second end of a web over the top of the vehicle seat and down at least a portion of the back surface of the back portion and through the bight toward the front surface;

placing a booster seat on a portion of the top surface of the seat portion;

attaching the first opposing end of the web to the booster seat;

attaching the second opposing end of the web to the booster seat.

Further provided is a method of mounting an occupant restraint system to a vehicle seat comprising a back portion having a front and back surface and a seat portion having a top and bottom surface, with the back and seat portions defining a bight therebetween, comprising the steps of:

placing a booster seat on a portion of the top surface of the seat portion;

engaging a connector attached to the booster seat to an anchorage located in the bight of the seat.

Additional features will become apparent to those skilled in the art upon consideration of the following detailed description of illustrative embodiments and claims exemplifying the best mode of carrying out the invention as presently perceived.

BRIEF DESCRIPTION OF THE DRAWINGS

FIG. 5 is a side elevation view of an illustrative seat portion showing a connector in an extended position.

FIG. 6 is a partial view showing the connector of FIG. 5 in a stowed position.

DETAILED DESCRIPTION OF THE DRAWINGS

Figure 1:
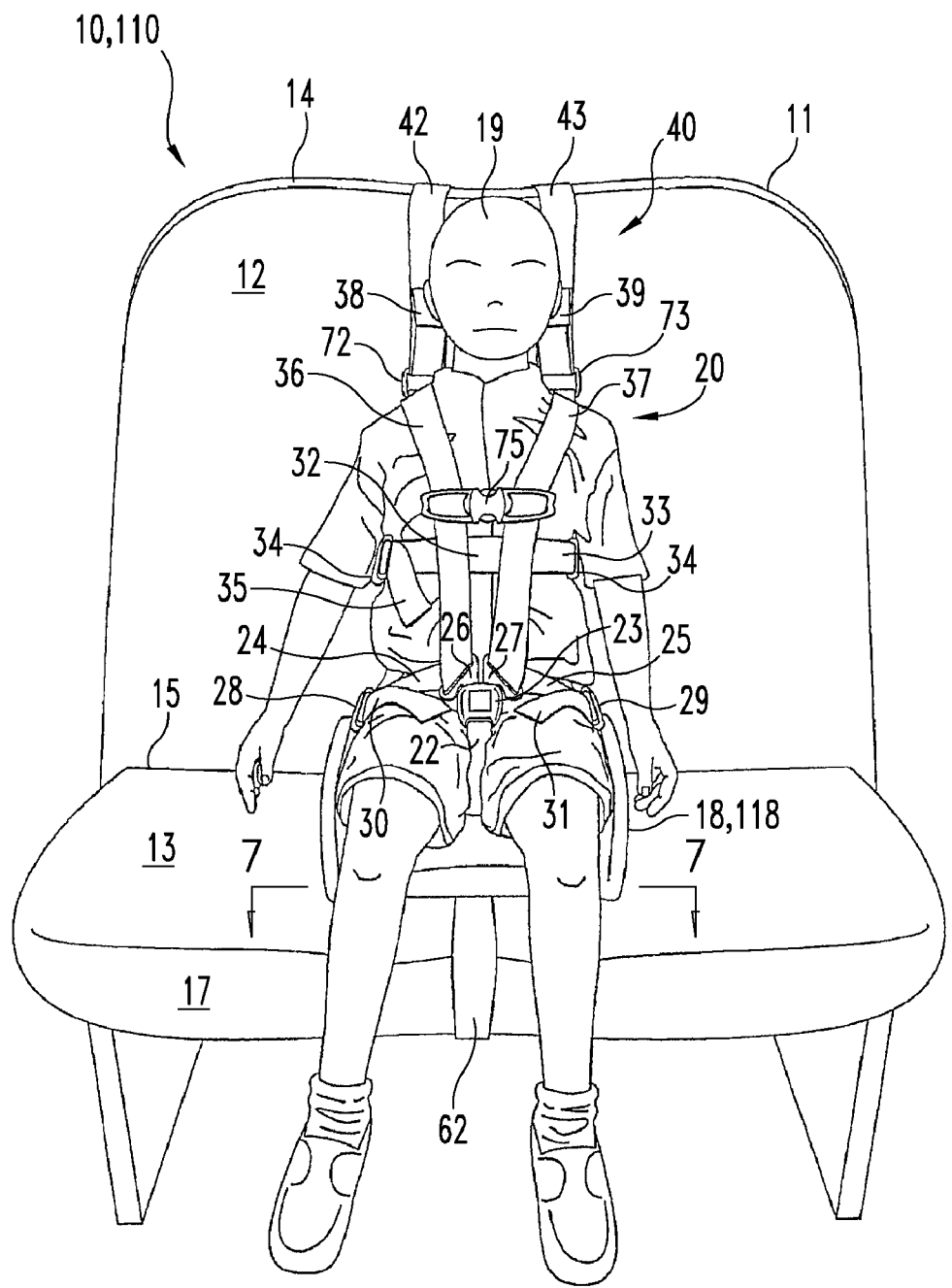
FIG. 1 is a front view of a seat having one exemplary embodiment of an illustrative restraint system mounted thereto.

For the purposes of promoting an understanding of the principles of the invention, reference will now be made to the embodiments illustrated in the drawings and specific language will be used to describe same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The drawings depict several illustrative embodiments, which will be described now in detail. Throughout the description and drawings, the same reference numerals are used to refer to identical components in the different embodiments, with the same description of those components applying throughout. In addition, reference numerals incremented by 100 or 200 generally are used to refer to substantially identical components, with the differences between the embodiments described herein. In addition, it will again be appreciated that unless specified otherwise the various components described herein may be made from any suitable non-metallic, metallic, or composite materials, or a combination thereof if desired.

Referring to FIGS. 1-17, illustrative embodiments of the vehicle restraint system are depicted. In the illustrative embodiments, the illustrative restraint systems 10, 110, 210, 310 are configured for use with a vehicle seat 11 comprising a generally vertically extending back portion 12 and a generally horizontally extending seat portion 13. The back portion or seat back 12 and the seat portion 13 converge and meet in an area generally known as the bight 15 of the seat. As used herein below, vehicle seat 11 in FIGS. 1-4 and 9-10 may be any conventional vehicle seat found in for example a bus, a van, a truck, an SUV, an RV, a watercraft, or an aircraft, or, with the exception of the embodiment illustrated in FIG. 10, one-half or one-third of a two passenger or three-passenger seat etc. found in any such vehicle.

Figure 2:
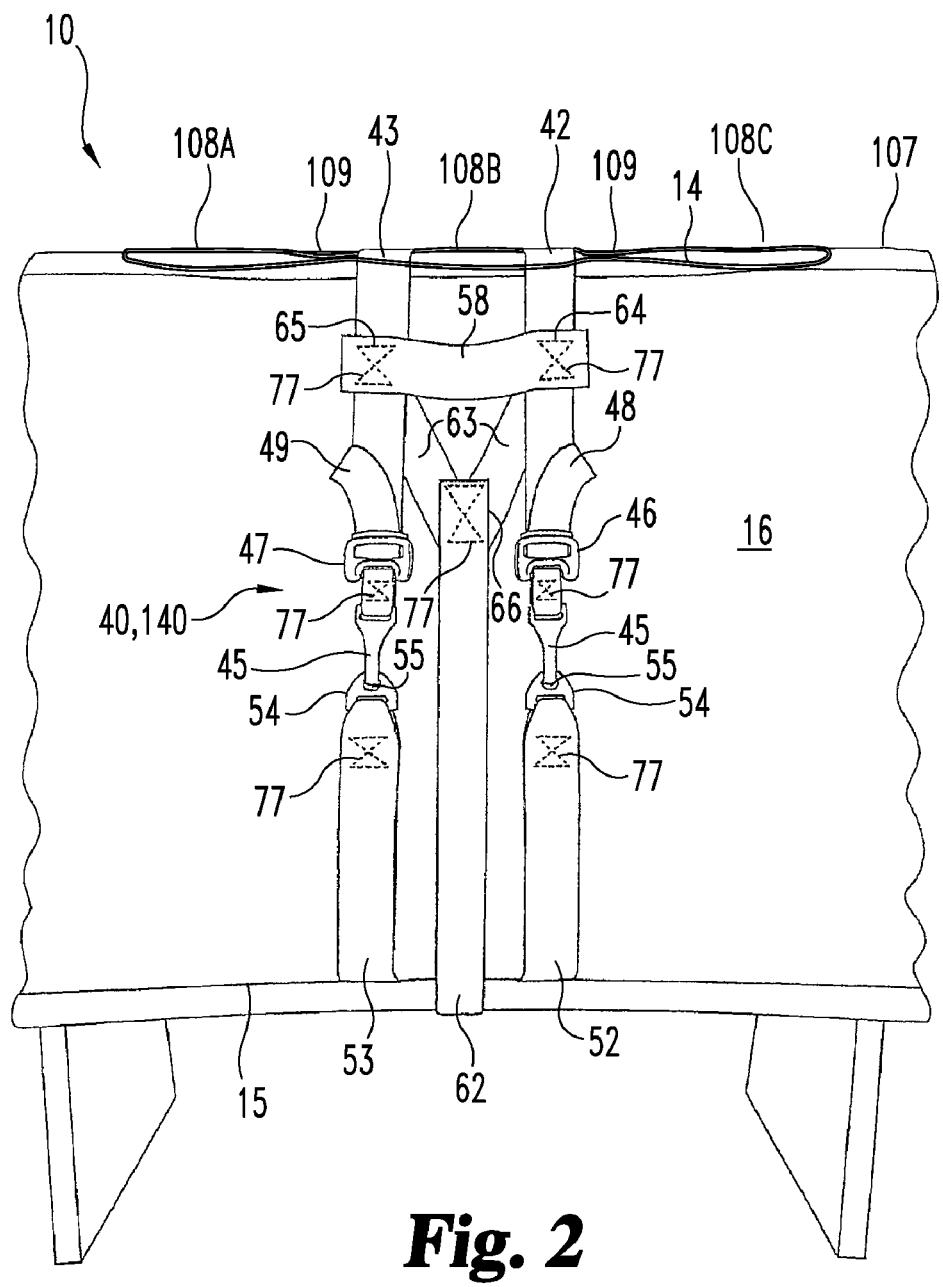
FIG. 2 is a rear view of the seat of FIG. 1 depicting the back of the illustrative restraint system of FIG. 1.
Figure 10:
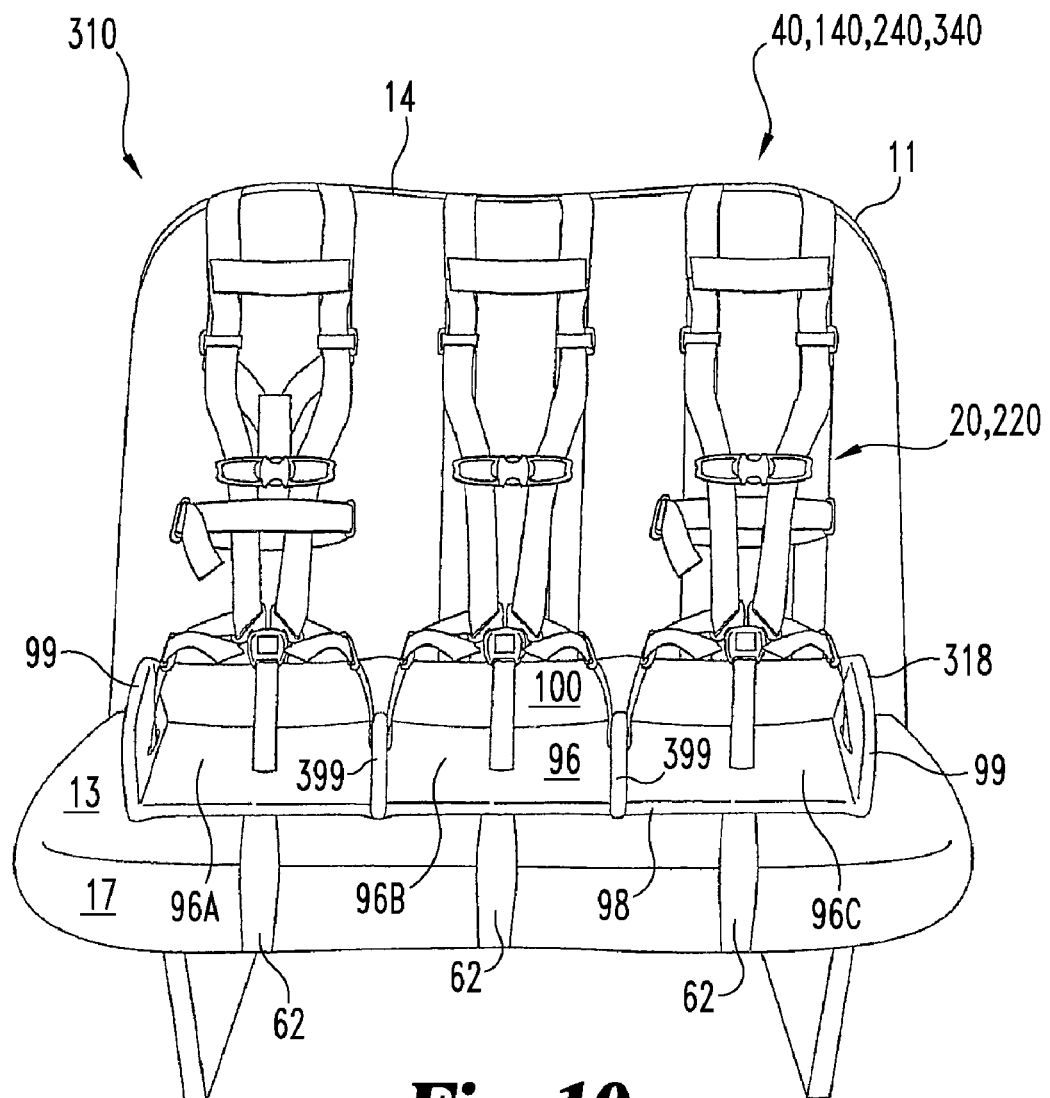
FIG. 10 is a front view of a seat having another exemplary embodiment of an illustrative restraint system mounted thereto.
Figure 11:
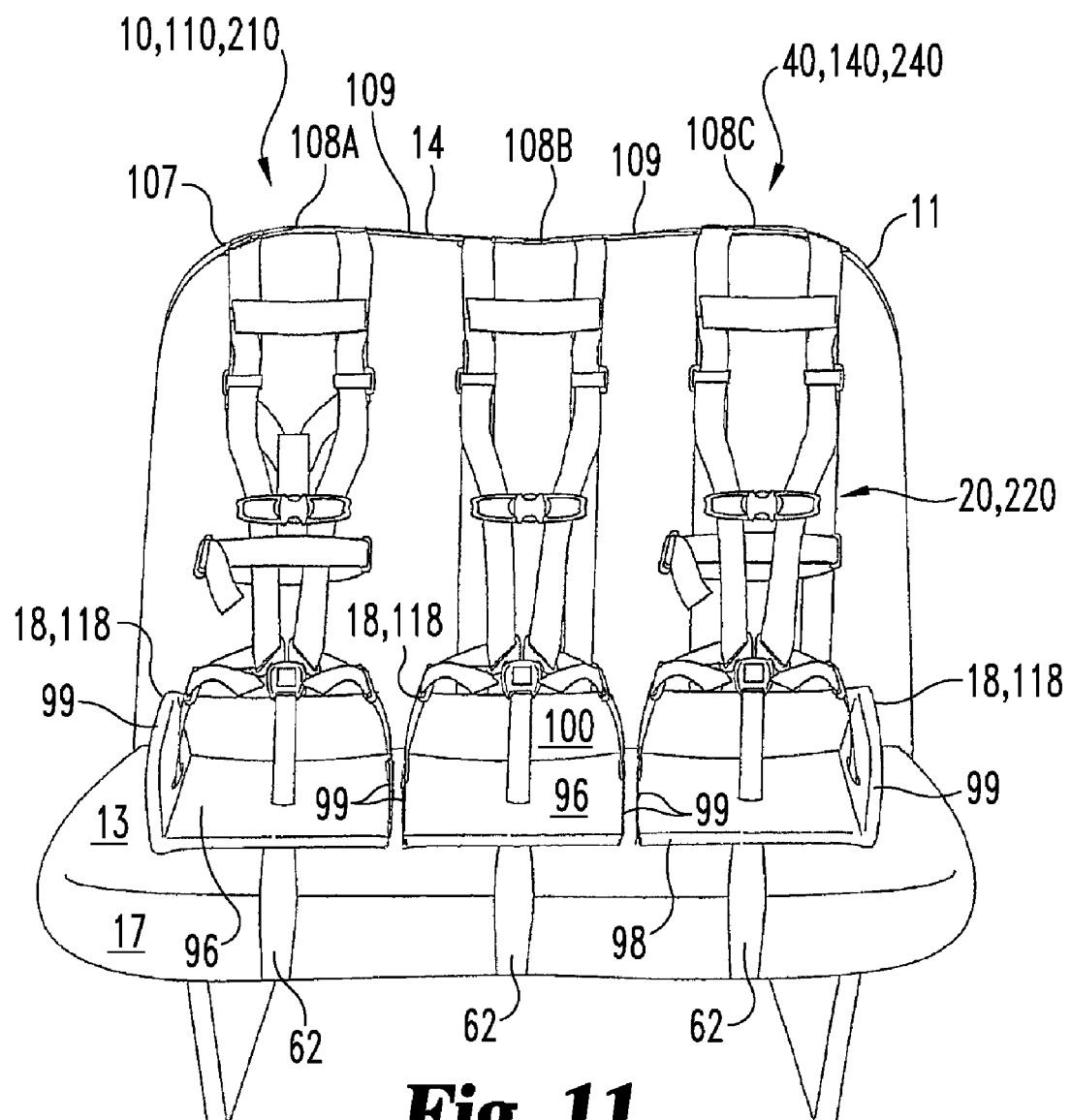
FIG. 11 is a front view of a seat having three exemplary embodiments mounted thereto.
Figure 12:
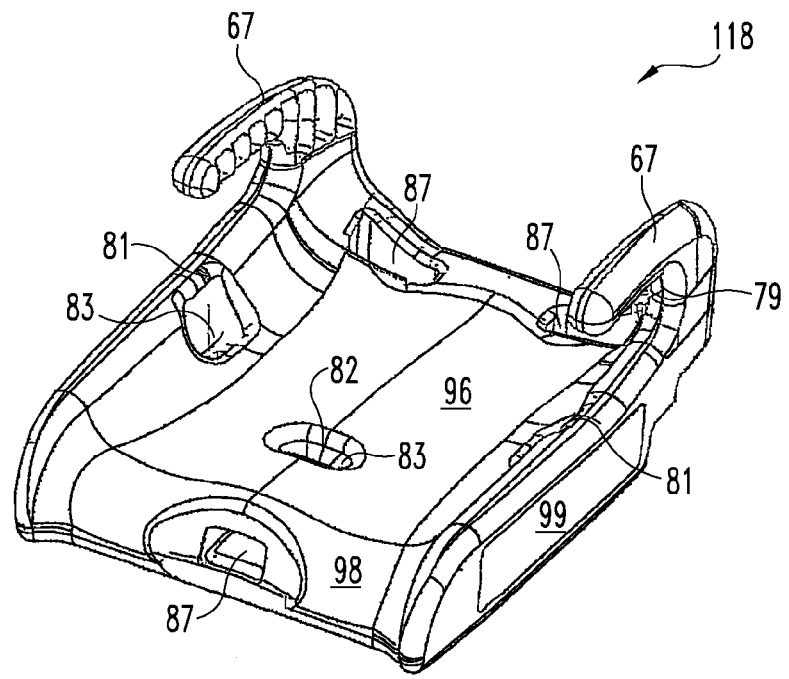
FIG. 12 is a top perspective view of another illustrative seat portion.
Figure 13:
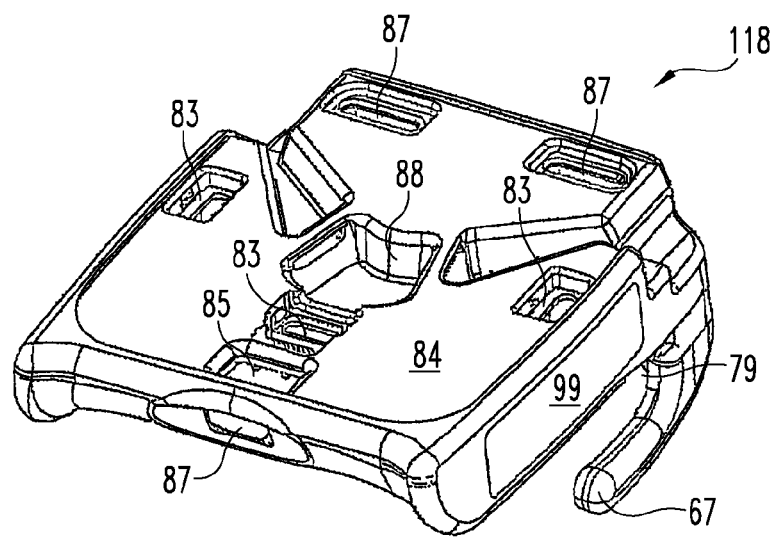
FIG. 13 is a bottom perspective view of the illustrative seat portion of FIG. 12.

Illustrative restraint systems 10, 110, 210, 310 comprise generally a seat base 18, 118, 318 such as for example a booster seat 18, 118, 318, a restraint assembly 20, 220 and a mounting assembly 40, 140, 240, 340. As will be explained further, the vehicle's own restraint system may be used in addition to or in lieu of mounting assembly 40, 140, 240 to mount booster seat 118. The booster seat 18, 118, 318 may be of any suitable design. For example, and without limitation, it may be molded from plastic, or other suitable metallic, non-metallic or suitable composite material and may be contoured. Illustratively, as best seen in FIGS. 5, 12 and 13, booster seat 18, 118 comprises a top surface 96, a bottom surface 97 opposite and spaced apart from the top surface 96, a front surface 98 spaced apart and opposite a rear surface 100, and spaced apart side surfaces 99 disposed generally between or adjacent to the top 96, bottom 97, front 98 and rear 100 surfaces. The top surface 96 may be contoured to conform to a human body. As seen in FIG. 10, booster seat 318 comprises intervening side surfaces 399 that divide the top surface 96 into multiple top surfaces 96A, 96B and 96C to accommodate or support a passenger or occupant on each of these surfaces 96A-C. The side surfaces 99 depicted in FIG. 10 are somewhat exaggerated for illustrative purposes and may or may not be of lesser height in actual commercial embodiments. In any event, the intervening side surfaces 399 may be formed in the booster seat 318 with a vertical height less than the height of the side surfaces 99. While two intervening side surfaces 399 are depicted, it will be appreciated that a single intervening side surface 399, in excess of two intervening side surfaces, or no intervening side surfaces 399 at all would fall within the scope of the invention. For example and without limitation, base 318 might be formed with a single intervening side surface 399 to accommodate only two occupants, or formed with three intervening side surfaces 399 to accommodate four occupants as desired, or might be formed with no intervening side surfaces 399 to accommodate two to four occupants depending on the number of restraint assemblies. No matter the number of passenger or occupant sections desired, it will be appreciated that the booster seat base 318 of system 310 may be of monolithic construction. Such monolithic construction may be rigid across the length of the booster seat 318, or it may be for example collapsible. For example, though integrally connected to each other, as by a hinge, occupant section 96A may fold over on top of section 96B and section 96C may fold under section 96B. In other embodiments, the various occupant sections 96A-C may comprise wholly separate sections that may be releasably joined together for occupant use and then disassembled for ease of transport. It will be appreciated, however, that when the booster seat base 318 is mounted to the vehicle seat 11, it may be desirable that the base 318 be rigidly assembled. It is also the case, as noted above, that two or three or more restraint systems 10, 110, 210 may separately be disposed on a two-passenger or three-passenger seat such that two or three separate booster seats 18, 118 are disposed on the vehicle seat 11 as shown for example in FIG. 11. In such a case, or even if only one booster seat 18, 118 is mounted to the vehicle seat as seen in FIG. 2, it might be desirable to use a positioning member 107, such as for example and without limitation the illustrative positioning member depicted in FIG. 17. Positioning member 107, which illustratively (FIGS. 2 and 11) may be adjacent to or even coupled to the seat back top portion 14, comprises a plurality of voids or loops 108A-C configured to position the mounting assemblies on the seat 11. Illustratively, positioning member 107 may be fashioned from any suitable flexible, semi-flexible, semi-rigid or rigid material and such material may be metallic, non-metallic or composite in composition. For example and without limitation, positioning member 107 may be fashioned out of a flexible or semi-flexible belt or web material looped back on itself and coupled together at various points 109 to form loops or voids 108A-C. The coupling points 109 may be formed using for example and without limitation sewing, gluing, melting, cementing, riveting, hook and loop, tacking and the like. It will be appreciated that while three loops or voids 108A-C are illustrated, the positioning member could be fashioned with two loops or four or more loops as desired. For example, in the case of a vehicle having seats with only one or two positions, the positioning member 107 may be formed with only one or two loops 108. Positioning member 107 may be permanently or non-permanently coupled to the vehicle seat, for example and without limitation to the top portion 14 of the seat back portion 12 (FIG. 2), or to the back portion 12 itself or to the opposite back surface 16 of the back portion 12. The positioning member 107 could even be used with system 310 of FIG. 10. As can be seen in FIG. 2, the positioning member 107 need not be coupled to the vehicle seat at all as the one or more sets of straps 42, 43, will keep the positioning member 107 in place. It will be appreciated that the use of a positioning member 107 may necessitate the elimination of cross member 58 and V-member 63, or the use of a non-permanently attached or removable cross member 58 and V-member 63 as further described below.

The illustrative booster seats 18, 118, 318 may be equipped with any desired amount and composition of cushioning and may be covered by cloth or other suitable material such as for example the cover 180 depicted in FIG. 8 as will be explained further below. The booster seat or base 18, 118, 318 illustratively may be formed with various indentations 93, 102 (FIGS. 5 and 7), which may for example provide rigidity while reducing weight. The booster seat or base 18, 118, 318 illustratively may accommodate occupants from about 30 pounds up to about 90 pounds. Looking at FIGS. 7, 12 and 13, it can be seen that the booster seat 18, 118, 318 may also be formed with various anchor points, such as for example mounting assembly anchor points 86 and 85, each illustratively formed with a void 87 therethrough, and restraint assembly anchor points 81 and 82, each also illustratively formed with a void 83 therethrough. Also formed through at least a portion of each side surface 99 and the rear surface 100 may be one or more recesses 103, which are sized to receive any of a number of suitable connectors such as for example and without limitation connector 68. Additional recesses (not shown), each sized to receive therein an additional connector 68, may also be formed through rear surface 100. For example, additional recesses might be desired in the vicinity of intervening side surface(s) 399. Examples of some suitable illustrative connectors 68 are disclosed in co-owned U.S. Pat. No. 6,962,394, the disclosure of which is now incorporated herein by reference. As will be explained, indentations 102 also facilitate the grasping and manipulation of illustrative connector 68 by a user. The booster seat 18, 118, 318 further comprises a web guide 88, which is formed with a void 89 therethrough. The various voids 83, 87, 89 illustratively help lighten the base 18, 318 and may provide rigidity, as well as anchor points. It will be appreciated that the booster seat 18, 118, 318 could also serve as a carrying case, similar to for example and without limitation, a suitcase or brief case, having a handle (67 and not shown) and configured to hold and store therein or thereon the restraint and mounting assemblies. The booster seat 18, 118, 318 may be configured to mount to vehicle seat 11 and properly position an occupant for use of the restraint assembly 20, 220, which is attached to the booster seat 18, 118, 318 as will now be explained.

The restraint assembly 20, 220 and the mounting assembly 40, 140, 240, 340 may each be attached to the booster seat 18, 118, 318 and associated or coupled to each other as described herein. Each mounting assembly 40, 140, 240, 340 generally comprises one or more flexible or semi-flexible members such as for example without limitation webs, belts, straps, ropes, or the like. Illustratively, the restraint assembly 40 of the exemplary embodiment of FIGS. 1 and 2 comprises five wrap around flexible or semi-flexible members, namely, a pair of over webs 42, 43, a pair of under webs 52, 53 and a third under strap or web 62. The illustrative pair of over webs 42 and 43 straddle over the top portion 14 of the back portion 12 with each web 42, 43 having opposing ends that proceed over and downwardly away from the top portion 14 along at least a portion of the front surface of back portion 12 and along at least a portion of the opposite back surface 16 of back portion 12. The first opposing end portions of webs 42, 43 proceed down the front surface of back portion 12 and are coupled to the booster seat 18, 118, 318 by any suitable means, such as for example, without limitation, by rivet, screw, cement, tack, slot and spindle, snap, hook and loop, zipper, button, melting, tongue and buckle and the like, and even illustrative connector 68 may be used. For example, the first opposing end portions of webs 42, 43 may couple to the seat 18, 118, 318 at one or more of the mounting assembly anchor points 86 formed in the booster seat 18, 118, 318 as seen for example in FIG. 7. Those skilled in the art will appreciate that other mounting assemblies, such as for example the illustrative mounting assembly 140 depicted in FIG. 3, fall within the scope of the invention. In mounting assembly 140, the first opposing end portions of webs 42, 43 illustratively form connecting member 44. Connecting member 44 may be made from any suitable flexible, semi-flexible, rigid or semi-rigid material. It may comprise a strap, web, rope, belt or the like. So too, it may be fashioned from any suitable plastic, metallic, non-metallic, or composite material. The connecting member 44 illustratively forms a V-shape. It may be a single monolithic member or it may be comprised of several members which form the V-shape, converging toward and coupling to member 41 as depicted. So too, for example, web portions 42, 43 may fold back on themselves, and illustratively, be sewn, melted, glued, cemented, riveted, tacked, or the like to themselves in order to create the angled, or V-portions 44. One of other suitable alternatives may be for example to couple the first opposing end portions of webs 42, 43 to separate lengths of web 44, or other suitable material, to form the V-portions. Member 41 may be any suitable flexible, semi-flexible or rigid member. Illustratively, member 41 comprises a flexible or semi-flexible member such as a web, belt, strap, or rope. Illustratively, connecting member 44 may be attached to web 41 by any suitable means such as for example and without limitation by sewing, gluing, melting, cementing, riveting, hook and loop, tacking and the like. Web 41 illustratively proceeds down at least a portion of the front surface 12 and attaches to the booster seat 18, 118, 318 at a suitable mounting assembly anchor point 86 depicted for example in FIG. 7, or at a mounting assembly anchor point (not shown) formed generally somewhere between the anchor points 86 depicted in FIG. 7, or even elsewhere on booster seat 18, 118, 318. It will be appreciated that even further illustrative mounting assembly embodiments are suitable, for example, web 41 could form or be connected to additional connecting member V-portions at the opposing end of web 41 opposite the depicted V-portions of connecting member 44, each of which in turn could attach to mounting assembly anchor points 86. So too, one or more additional members (not shown) could be placed adjacent the webs 42, 43 and proceed generally parallel thereto, attaching, for example, to cross member 58 (FIGS. 2 and 4) and/or to cross member 59 (FIGS. 1 and 3), each described in more detail below, and to booster seat 18, 118, 318 at one of the already described anchor points, or yet another mounting assembly anchor point 86.

Figure 3:
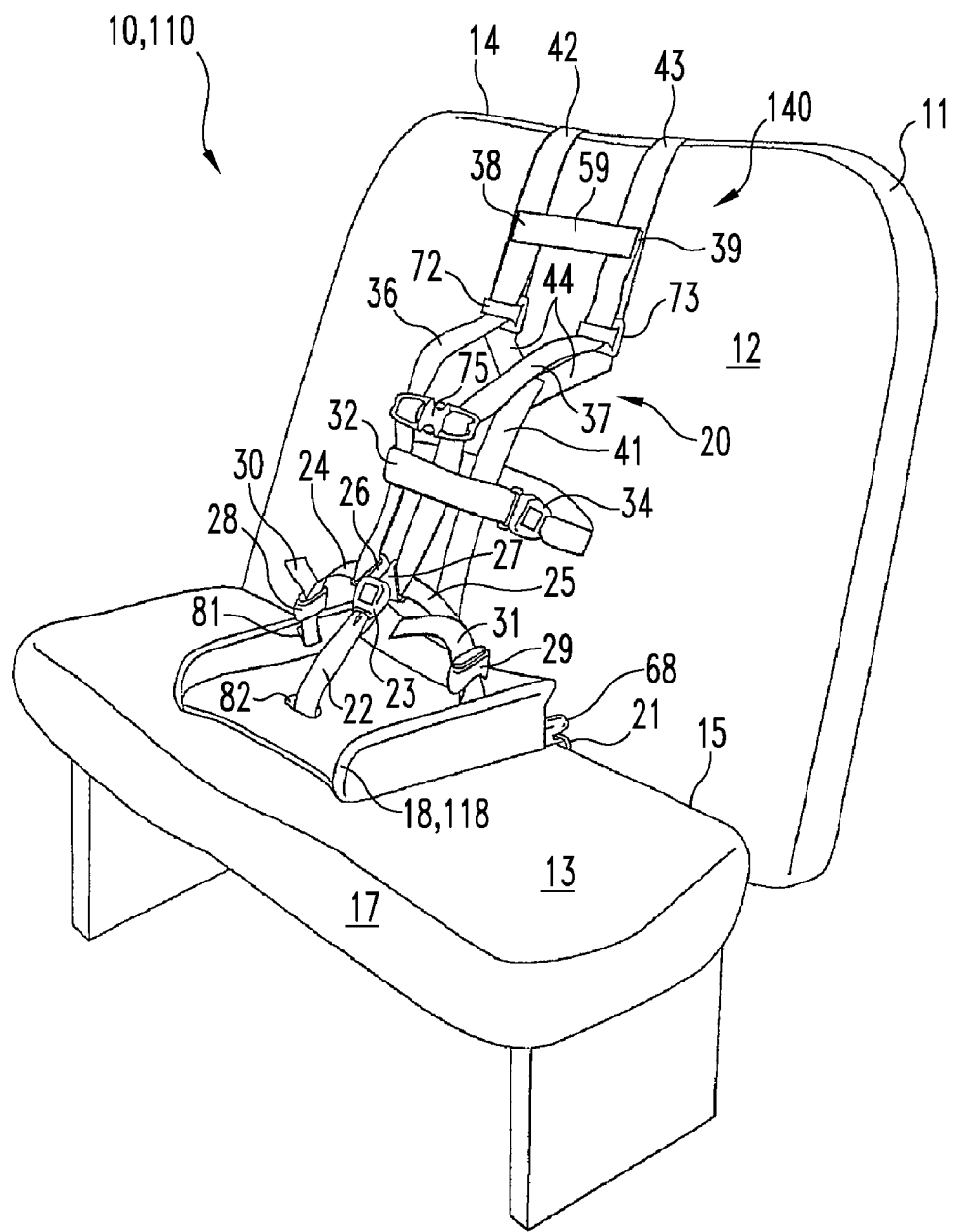
FIG. 3 is a perspective view of the seat of FIG. 1 depicting another exemplary embodiment of an illustrative restraint system.
Figure 4:
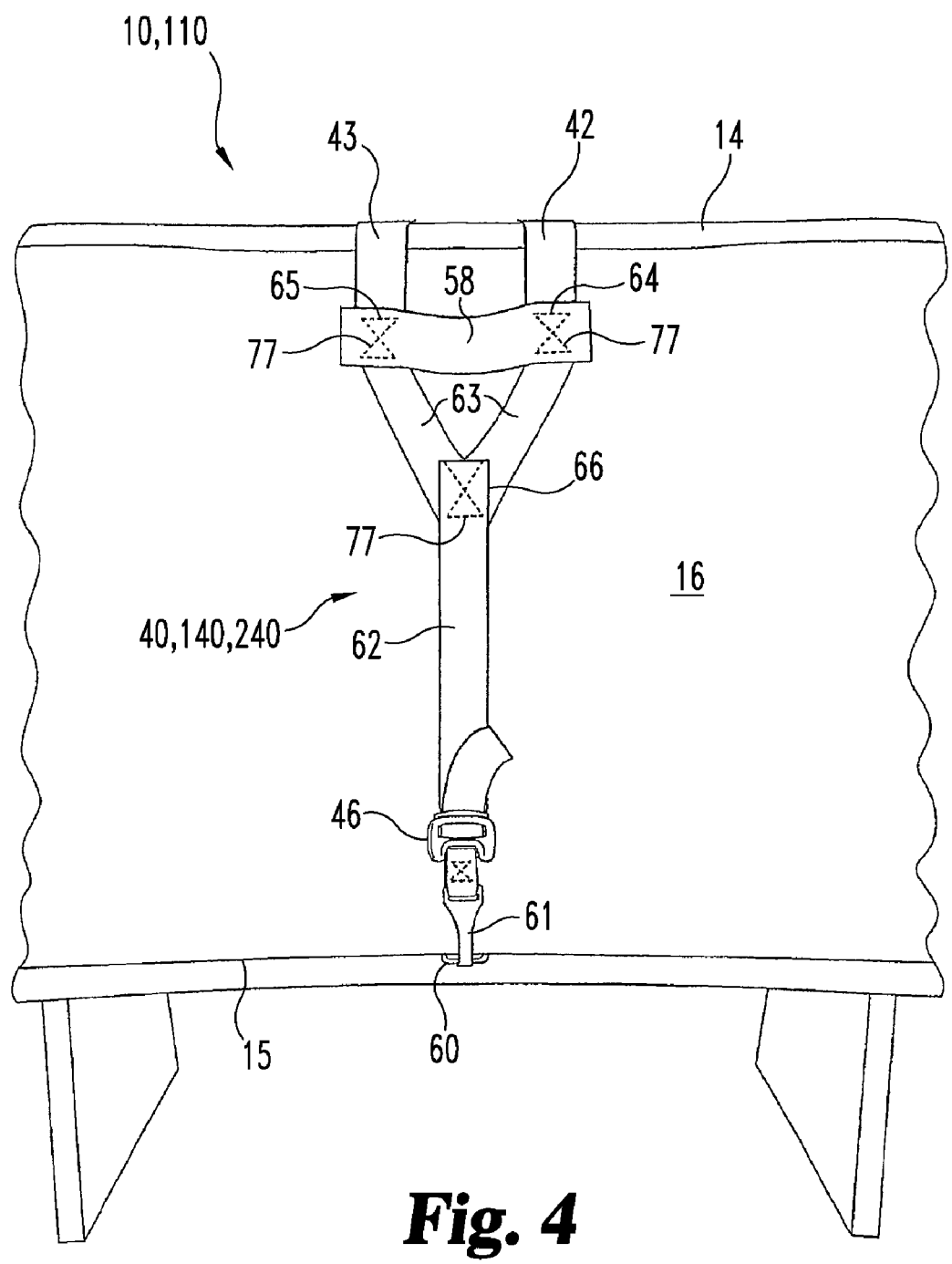
FIG. 4 is a rear view of the seat of FIG. 1 depicting the back of another illustrative restraint system.

The opposing second end portions of webs 42, 43 generally proceed down at least a portion of the opposite back surface 16 as best seen in FIGS. 2 and 4. Illustratively, web adjusters 46 and 47 are movably disposed on respective webs 42 and 43. Web adjusters 46 and 47 may each be equipped with a conventional fastener 45, such as for example, without limitation, the pictured snap hook 45. Although the snap hook 45 is connected to the web adjuster 46, 47 by a piece of web, it may also be an integral part of the web adjuster, or connected to the web adjuster through any other suitable means. An non-exclusive example of a suitable fastener is the aforementioned connector 68, which is depicted in FIG. 5. Other fasteners or connectors known in the art could be used as well. Webs 42 and 43 may, but need not be associated by one or more cross-members 58, 59 which may be any suitable flexible, semi-flexible, rigid, or semi-rigid member. Illustratively, the cross-member 58 shown in FIGS. 2 and 4, and the cross-member 59 best seen in FIG. 3 may be a length of web, strap, rope, belt, and the like, without limitation. So too, the cross-members 58, 59 may be a piece of plastic or other rigid or semi-rigid member.

Referring to FIG. 2, the illustrative pair of flexible or semi-flexible members or under webs 52 and 53 each have opposing end portions. The first opposing end portions of each web 52 and 53 proceed down at least a portion of the back surface 16, proceed through the bight 15 of the seat emerging at the bottom of the front surface of the back 12, and are coupled to the booster seat 18, 118, 318 by any suitable means, such as for example, without limitation, by rivet, screw, cement, tack, slot and spindle, snap, hook and loop, zipper, button, melting, tongue and buckle, or other suitable fastener or connector, such as for example connector 68, and the like. Any such suitable coupling or fastener means may attach to the booster seat at one or more of the aforementioned mounting assembly anchor points 86 shown in FIG. 7, or as described herein. The second opposing end of each web 52 and 53 is equipped with a coupling member 54 which defines a coupling hole 55 therethrough. The coupling hole 55 is sized to receive the couple with the fastener 45 or other suitable connector in order to couple together webs 42 and 43 with respective webs 52 and 53. It will be appreciated that the webs 42 and 43 may be coupled together with webs 52 and 53 using any other suitable means. By way of example, and without limitation, webs 42 and 43 may be coupled together with webs 52 and 53 using: hooks and loops, seat belt buckles and tongues, snaps, zippers and the like or any suitable connector such as for example connector 68, or any combination thereof. So too, as will be explained, webs 42 and 52, and/or webs 43 and 53 respectively may be combined together each to form a single web. In other words, a single web may replace the combination of webs 42 and 52, and/or the combination of webs 43 and 53, which single web(s) 42/52 and/or 43/53 could connect directly to anchor points 86 using fastener 45 or connector 68, for example. Also, one or both fasteners 45, or connector 68 for example, could couple directly to a tether anchorage such as for example the anchorage 60 of FIG. 4, or to a lower anchorage 21 of FIG. 3, rather than to webs 52, 53 and/or directly to any of the anchor points 86 on booster seat 18, 118, 318 Illustratively, a third under strap 62 may be positioned between the over webs 42, 43 and between the under webs 52, 53 as depicted in FIG. 2. Although each of these webs 42, 43, 52, 53, 62 is shown in spaced-apart relation to each other, they need not be spaced apart. Like the other webs 42, 43, 52, 53, under web 62 may be made of any suitable flexible or semi-flexible material. Under web 62 comprises two opposing ends. First opposing end of under web 62 illustratively is coupled to each of webs 42, 43 by the use of connecting member 63. Like connecting member 44, connecting member 63 may be any suitable flexible member such as for example a strap, web, rope, belt or the like. Connecting member 63 may also be a semi-flexible, semi-rigid or rigid member, for example a piece of plastic or other metallic, non-metallic or composite material. As depicted, connecting member illustratively forms a substantially V-shaped member. It will be appreciated, as described above in conjunction with connecting member 44, that this V-shaped connecting member 63 may be a monolithic member or it may comprise two or more pieces joined together by any suitable means such as for example by sewing, melting, gluing, cementing, riveting, tacking, or the like. It will also be appreciated that the connecting member 63 may be eliminated altogether, as for example in the case where the third under web 62 is coupled directly to the cross-member 58. So too, under web 62 could be coupled directly to only one of the over webs 42, 43. In any event, the connecting member 63 illustratively is coupled to over web 42 at position 64, to over web 43 at position 65, and to third under web 62 at position 66 by stitching 77. While these couplings illustratively are accomplished using stitching 77, as are the couplings of cross web 58 at positions 64, 65 and as are the fasteners 45 and coupling members 54 to respective webs 42, 43, 52, 53, those skilled in the art will recognize that other suitable couplings, both permanent and releasable or non-permanent such as for example and without limitation, snaps, rivets, tacks, hook and loop, glue, cement, melting, and the like may be used. It will be appreciated that the transition between a single web, for example webs 41, 62, and a V-shaped connecting member, for example connecting members 44, 63, may be aided by a rigid or semi rigid spreader (not shown) as is know in the art. One of many examples of a suitable spreader bar is found in U.S. Pat. No. 4,660,889, the disclosure of which is enclosed herein by reference.

The second opposing end of under web 62 proceeds downwardly away from cross-member 58 along at least a portion of the back surface 16, past the bight 15, under seat portion 13 passing along the bottom surface of the seat portion 13, upwardly around the front facing surface 17 of seat portion 13, and across at least a portion of the top surface of seat portion 13 to couple with booster seat 18, 118, 318 at mounting assembly anchor point 85 by any suitable means, such as for example, without limitation, by a snap hook 45, hook and loop, snaps, buttons, slot and spindle, tongue and buckle, cement, or connector 68, and the like. Although not shown in FIG. 2, it will be appreciated that under web 62 may be equipped with a web adjuster 46 as shown in the alternative embodiment of FIG. 4, in order to adjust the operable length of the web 62. The opposing end of under web 62 that couples with the booster seat 18, 118, 318 may form or be attached to a connector member (not shown), similar to connector members 44, 63, to allow coupling to the booster seat 18, 118, 318 at more than one anchor point 85 (and not shown). In addition, the opposing end of under web 62 that couples with the booster seat 18, 118, 318 may be attached to a fastener such as a snap hook 61 as shown in FIG. 4 or to a connector such as connector 68 which may couple directly with anchor point 85, as noted above, or directly to a tether anchorage 60 as shown in FIG. 4 and described herein below.

While FIGS. 1 and 2 depict five separate webs 42, 43, 52, 53 and 62, those skilled in the art will further appreciate that a single web, or two webs, or any other combination of one or more webs may be used to mount the booster seat base 18, 118, 318 to the vehicle seat 11. While this notion was briefly described above, further description now follows. For example, the webs 42 and 43, together with respective webs 52 and 53, conceptually may each comprise a single length of web, for use alone or in combination with one or more other webs. In such a case, for example, web 42 and web 52, or web 43 and web 53, would comprise a single length of web with the opposing ends of this length of web being attached to the booster seat 18, 118, 318 as described, for example using a central mounting assembly anchor point, and with at least one of the opposing end attachments being releasable. More particularly, the single web (not shown) conceptually formed by combining web 42 and web 52, or web 43 and web 53, could attach to booster seat 18, 118, 318 at an appropriately located mounting assembly anchor point 86 (or not shown), wrap around all or portions of the seat back 12, 14, 16, and either pass through the bight 15 and attach to one of the mounting assembly anchor points 86 (or not shown) or pass under the seat as web 62 may, and attach to mounting assembly anchor point 85. The first single strap formed by either webs 42, 52 or webs 43, 53 or perhaps any other suitable single strap or web, such as the single web 62 in FIG. 4, may be enough to mount the booster seat 18, 118, 318 to the vehicle seat 11, however, a second single strap, could also be used in conjunction with the first single strap to mount the booster seat 18, 118, 318 to the vehicle seat 11. For example, if the first single strap is formed by webs 42 and 52, then the second single strap could be formed by webs 43 and 53 to form a single length of web having at least one end attached to the booster seat in a non-permanent manner, and having the opposing end attached in either a permanent or non-permanent manner for use with the first single web conceptually formed by uniting web 42 and web 52, or vice versa. So too, a single web could be used with the separate combination of webs 42 and 52, or of webs 43 and 53 such that three webs would be used.

By way of example and without limitation, the booster seat 18, 118, 318 and mounting assembly 40 as just described may be mounted to seat 11 as follows. The booster seat 18 may be placed on a portion of the top surface of seat portion 13. Then the over webs 42, 43 may be coupled to the booster seat 18, if not already coupled to the booster seat 18 when placed on the seat portion 13. The webs 42, 43 may then be routed over the top portion 14 and down at least a portion of the back surface 16 as described and then coupled to the under webs 52 and 53 by mating of the fasteners 45 and couplers 54 as described. Illustratively, the webs 42, 43 could also, but need not be routed through any one of the voids or loops 108A-C of positioning member 107 as desired. If the third under web 62 is not already coupled to the over webs 42, 43, and /or if the cross-member 58 is not already coupled to the over webs 42, 43, then the third under web 62 and the cross-member or members 58 may be coupled to the webs 42, 43 as described. Then the under webs 52, 53 may be passed over at least a portion of the back surface 16 and through the bight 15 and then connected to the booster seat 18, 118, 318 as described, and the under web 62 may be passed under and across the bottom surface of seat 13 and attached to the booster seat 18, 118, 318 as described. Then the loose ends 48 and 49 are pulled away from respective adjusters 46, 47 to take the slack out of the webs 42, 43, 52, 53 as desired. So too, the slack may be taken out of under web 62 through the use of a web adjuster 46 (FIG. 4) or other suitable means known to those skilled in the art. It will be appreciated that the foregoing steps may be accomplished in any other suitable order or way. For example, the under webs 52, 53 may be attached to the booster seat 18, 118, 318 and then passed through the bight 15 and then passed upwardly for coupling with over webs 42, 43. It will also be appreciated that any of the above described webs 42, 52, 43, 53, 62 may be augmented by additional webs and fasteners, or may be combined and/or eliminated, as explained above, such that a single web could be passed down the back surface 16, and through the bight 15 to couple to the booster seat 18, 118, 318, or down the back surface to couple directly to a tether anchorage or a lower anchorage attached to the vehicle.

A non-exclusive example of an illustrative mounting assembly 240 utilizing a single web is shown in FIG. 4. For convenience, the single web is labeled as 62, but it could just as easily have been labeled 42, 43, 52, 53 since any single web is contemplated. Mounting assembly 240 is substantially similar in many respects to mounting assembly 40. Therefore, while additional webs such as for example under webs 52 and 53 have been eliminated, over webs 43, 42, under web 62, cross member 58 and connecting member 63 are constructed and operate substantially in accordance with the above description, with the exception that, as noted above, web 62 illustratively is equipped with a fastener 61 and web adjuster 46 configured to attach directly to a tether anchorage. Therefore, as shown in FIG. 3, web 62 need not attach to the front of base or booster 18, 118, 318; although, if desired, a web attached to the front of base 18, 118, 318 and a web attached to a tether anchorage is contemplated. It will be appreciated that fastener 61 is substantially similar to fasteners 45. Also, fastener 61 could be replaced by a connector, such as illustrative connector 68 and configured to attach directly to a lower anchorage such as anchorage 21. So too, any such fastener 45, 61 or connector 68 could pass through the bight 15 and attach directly to the booster seat 18, 118, 318 at, for example, mounting assembly anchor point 85. Although the tether anchorage 60 is shown attached to the vehicle generally at the bight of the vehicle seat, it will be appreciated that it may be attached or coupled to the floor of the vehicle, under the seat portion 13, to the back portion 12, to the parcel shelf (not shown) of a vehicle, or to another suitable location as desired and perhaps as described by rules and regulations such as for example and without limitation FMVSS 225. The single-strap 62 configuration of mounting assembly 240 could also be equipped with a V-shaped connecting member at one or both ends, such as connecting member 44 or 63, in order to provide more than one connection to mount to the booster seat 18, 118, 318 anchor points 85, 86 and/or to the vehicle's anchorages 21, 60. This just described single-strap 62 back portion of mounting assembly 240 may be combined with the front portion of mounting assembly 40 (FIG. 1 and as described) or the front portion of mounting assembly 140 (FIG. 3 and as described) or vice versa. It will be appreciated that the booster seat 18, 118, 318 may be equipped with fasteners 45, 61 and/or connectors 68 which couple with coupling members 54 attached to any of the end portions of any of the webs 42, 43, 52, 53, 62 of the various mounting assemblies 40, 140, 240, or directly to the vehicle as will now be described.

Restraint systems 110, 210, 310 represent further illustrative embodiments. As noted above, restraint systems 10, 110, 210, 310 generally comprise a seat base 18, 118 or 318, a restraint assembly 20, 220, and any of the mounting assemblies 40, 140, 240 previously described and combinations and/or variations thereof. Thus, looking at restraint systems 210 and 310 of FIGS. 9 and 10, while over webs 42, 43 and under web 62 are depicted generally as in FIG. 1, any of the configurations of mounting assemblies 40, 140, 240 may be used as depicted in FIGS. 1-4 and/or described herein. Indeed, the illustrative embodiment of FIG. 10 depicts a mounting assembly 340 comprising a mounting assembly portion having over webs 42, 43 connected to the base 318 as in assembly 40 as well as another mounting assembly portion having over webs connected to connecting member 44 in turn connected to the web 41 and in turn connected to the base 318 of FIG. 10 in for example the manner depicted for mounting assembly 140 in FIG. 3. It will be appreciated, therefore, that the illustrative embodiment 310 of FIG. 10 could have any of the mounting assemblies 40, 140, 240 applied consistently throughout the mounting portions associated with each passenger or occupant support surface or section 96A-C, or any combination of the mounting assemblies 40, 140, 240, such as for example has just been described. It will further be appreciated that the passenger support surfaces 96A-C depicted in FIG. 10 could be replaced by individual and generally unconnected booster seats 18, 118 representing any combination of mounting assemblies 40, 140, 240 and/or restraint assemblies 20, 220 associated therewith. One or more of the under straps 62 shown in FIG. 10 could be eliminated altogether, or attached to a tether anchorage as in FIG. 4. For example, just the center strap 62 in FIG. 10 could be eliminated altogether and the left and right straps 62 could be used and one or more of the remaining straps 62 may be attached as already described or may be attached to a tether anchorage rather than to the front of booster 318. So, too, in the illustrative embodiment of FIG. 9, the strap 62 could be eliminated altogether or attached to a tether anchorage 60, rather than to the front of the booster base 18, 118.

Figure 7:
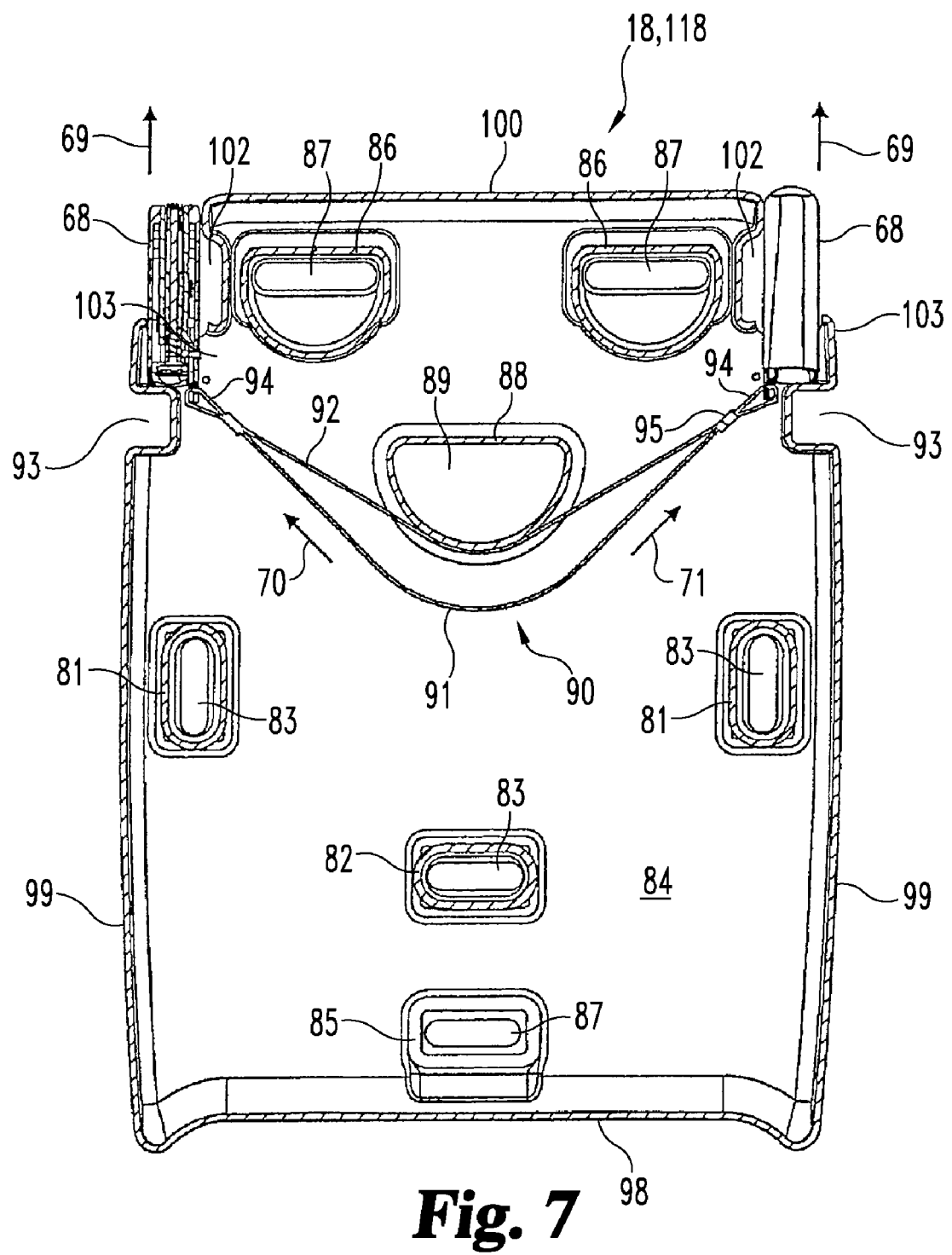
FIG. 7 is a sectional view of an illustrative seat portion taken generally along the line 7-7 of FIG. 1.

In addition to or in lieu of the mounting assemblies 40, 140, 240 described above, restraint system 110 uses mounting fasteners and/or connectors, which are also adaptable for use with restraint systems 210 and 310. Thus, restraint systems 10, 110, 210, 310 may comprise fasteners 45, 61 or connectors such as illustrative connector 68 carried by or attached directly to the booster seat 18, 118, 318. Referring to FIG. 7, for example, illustrative connectors 68 are received in recess 103 and are retained therein by one or more flexible, semi-flexible, or semi-rigid member, such as for example a web, belt, strap, rope or the like. For example, connector retention assembly 90 comprises web portion 91 and web portion 92 and illustratively retains the connectors 68. More specifically, web portion 91 and web portion 92 are coupled to each connector 68 at mounting aperture 94. While web portion 91 and web portion 92 may be separate and discrete lengths of web associated with each other by for example stitching, melting, hook and loop, snaps, rivets, gluing, cementing, and the like, they may also be associated by band or clamp 95, or they may be a single length of web. In any event, web portion 92 illustratively has an elastic or semi-elastic portion that allows the length of web portion 92 to increase as a force along the direction of the arrows 69 in FIGS. 6 and 7 is applied to web portion 92. For example a user may grasp one, or both, of the connectors, which grasp illustratively is facilitated by indentation 102, and pull the connector outwardly away from its recessed position (FIG. 6) in the recess 103 in the direction of arrow 69. This force urges web portion 92 against the web guide 88, and causes the elastic portion of web portion 92 to expand. This force also urges web portion 91 against the web guide 88 as web portion 91 is also pulled or urged in the direction of arrow 70 and/or 71. However, web portion 91 illustratively does not comprise an elastic portion; therefore, when web portion 91 reaches web guide 88 under normal conditions it will not lengthen and the outward movement of connector 68 generally will be halted. Therefore, the degree of the connector's 68 travel outside of the recess 103 is generally limited both by the degree the elastic portion of web portion 92 may be expanded and by the length of web portion 91. Illustratively, it is the length of web portion 91 that provides the ultimate limitation on the degree of connector's 68 travel outside the recess.

In operation, the illustrative booster seat 18, 118 of restraint system 110 may be mounted to the vehicle seat 11 by pulling one of the connectors 68 out of recess 103 and engaging it with for example lower anchorage 21 (FIG. 3) or other suitable anchorage. In the engaged position, the lower anchorage 21, such as for example and without limitation a roundbar, is located behind the finger 78 of the connector 68. Thereafter, or at the same time, the other illustrative connector 68 may be engaged with another low anchorage 21. It will be appreciated that the connector(s) 68 may be fixedly attached to the booster seat 18, 118, 318 in a ready position, rather than extending from and retracting into the recess 113. In such a case, for example, the connectors 68 might be covered by a door or other covering and the need for the retention web assembly 90 would be eliminated. So too, the connectors 68 might be fixedly attached to the booster seat 18, 118, 318 but pivot, whether up, down, laterally or obliquely, from a recess into position for engagement without need for the retention web assembly 90. It would also fall within the scope of the invention for the connectors 68 to telescope out of recess 103 on some type of rigid, perhaps lockable and retractable railing system or an equivalent thereof.

Even further ways of mounting the bases 18, 118, 318 to a vehicle seat 11 are contemplated. For example, and without limitation, a pair of opposing slots (not shown) may be formed through sides 99 to receive therethrough a belt or other flexible or semi-flexible member to mount the base 18, 118, 318 to a vehicle seat 11. For example and without limitation, a slot could be provided in each of indentations 93 and a vehicle's integral seat belt passed through one of the slots, around web guide 88 and through the opposite slot. Such a seat belt might for example and without limitation be the lap belt and tongue integral to an airplane seat, which tongue is passed through the opposing slots in succession and engaged with the buckle connected to the other lap belt on the airplane seat to mount the booster seat 18, 118 to the airplane seat. In another embodiment depicted in FIGS. 12 and 13, the use of a vehicle's integral seat belt restraint system to mount the booster seat 118, or the other booster seats 18, 318 if desired, to the vehicle is facilitated by arms, appendages or handles 67. Appendages 67 may but need not be an integrally formed part of booster seat 118 (or booster seat 18, 318 if desired) and may be shaped to form belt receiving channels 79. The lap belt of a two-point or a three-point vehicle restraint system may be received through the channels 79. It will be appreciated that booster seat 18 and 318 can also be formed with appendages 67 and in the case of booster seat 318, extensions to the vehicle's lap belt may need to be used. In another embodiment, more than one of the vehicle's lap belts may be used to mount booster seat 318 to the vehicle. The use of a vehicle's integrated seat belt system to mount booster seat 18, 118, 318 to the vehicle may be used alone or in combination with any of the mounting assemblies 40, 140, 240, 340 described herein and/or in combination with a connector 68 and anchorage system. Similarly, while engagement of the connectors 68, or even a single connector 68, or perhaps more than two connectors 68, as just described is sufficient to mount the booster seat 18, 118, 318 to the vehicle seat 11, the booster seat 18, 118, 318 may be further secured, if desired, using any of the mounting assemblies 40, 140, 240, 340 alone or in combination with the vehicle's integrated seat belt system(s) as already noted and described above. For example and without limitation, the connector(s) 68 may be engaged with the lower anchorages 21, and then web 62 may be wrapped over the top 14 of the seat back 12, or under the seat 13, and its connector 61 attached to any suitable tether anchorage 60 as described. The length of web 62 may be adjusted through the use of web adjuster 46, or other suitable device. As just noted, a center web 62 could be attached to anchor point 85 and routed downwardly to attach to a tether anchorage 60 on the floor, or routed downwardly under the seat 13 to attach to a tether anchorage 60 in the bight 15 or on the back 16 of the seat. So too, webs 42, 43, 52, 53, alone or in conjunction with web 62, could be routed and engaged as already described. Similarly, a single web could wrap around the seat and engage a tether anchorage 60, or attach directly to the booster seat as described herein to augment the mounting provided by connector(s) 68. In another embodiment, the connector(s) 68 could engage with one or more anchorages 21, 60, one or more of the vehicle's integral seat belts could be routed through the booster seat 18, 118, 318 slots (not shown) or channel(s) 79, and one or more webs connected to the booster seat 18, 118, 318 could be wrapped around the vehicle's seat in any suitable manner. In other embodiments, the vehicle's integral seat belts may be used alone, or the illustrative connectors 68 may be used alone, or one or more webs 41, 42, 43, 52, 53, 62, and/or 63 may be wrapped around the seat 11 alone to mount the booster seat 18, 118, 318. In short, any combination or permutation of the various mounting assemblies 40, 140, 240, 340 of restraint systems 10, 110, 210, 310 may be used alone or in conjunction with each other and/or with the vehicle's integrated seat belt system, which in turn may be used alone, as described herein and equipped with any of the illustrative restraint assemblies 20, 220 which will now be described.

The restraint assembly 20 configured for use with the vehicle restraint systems 10, 110, 310 illustratively may comprise a four-point or five-point restraint system. The illustrative restraint assembly 20 generally and illustratively comprises two lengths 36 and 37 of any suitable flexible or semi-flexible material such as for example without limitation a web, belt, rope, strap, and the like, having respective first ends 30 and 31 and respective opposing second ends 38 and 39. Second end 38 is attached to over web 42 and second end 39 is attached to over web 43 by any suitable means, such as for example without limitation by stitching, tape, hook and loop, cement, glue, melting, snaps, buttons, zippers, tacks and the like. Illustratively, a cross-member 59 (FIG. 3), as described above, may extend between over webs 42 and 43 and may be attached thereto and to webs 36 and 37 over or adjacent to ends 38 and 39. Other cross-members (not shown) may be spaced apart along the lengths of over webs 42 and 43 to further associate over webs 42 and 43. Opposing ends 30 and 31 are threaded through respective web adjusters 28 and 29. The web adjusters 28 and 29 illustratively may each be equipped with an integrated conventional tongue configured to mate with a conventional buckle (not shown) attached to the booster seat 18, 118, 318. In the alternative, the web adjuster 28 and 29 may be attached directly to the booster seat 18, 118, 318. Disposed on the webs between the opposing ends 30 and 38 and opposing ends 31 and 39 are conventional tongues 26 and 27, which are configured to mate with conventional buckle 23, which in turn is attached to booster seat 18, 118, 318 by connecting member 22. Connecting member 22 may be any suitable flexible, semi-flexible, rigid, or semi-rigid material and may be attached to the booster seat 18, for example, at restraint assembly anchor point 82 (FIGS. 3 and 7). Although not shown, connecting member 22 may optionally be equipped with a web adjuster operable to vary the length of connecting member 22. So too, as just noted, web adjusters 28 and 29 may be integrated with the tongues 26 and 27 as is known in the art. In addition, a central type adjust system could be used, such as for example and without limitation as disclosed in commonly owned U.S. Pat. No. 4,679,852, the disclosure of which is now incorporated herein by reference. Also, those skilled in the art will appreciate that an optional harness clip 75, described below, may be integrated with mid-belt adjusters (not shown) to replace or augment web adjusters 28, 29.

In operation, the webs 36 and 37 are placed over the shoulders of an occupant or passenger 19 sitting on the booster seat 18, 118, 318 which has been mounted to the seat 11 in any of the ways previously described. The tongues 26, 27 are then mated or engaged with the buckle 23 thereby forming a five-point restraint with the webs 36 and 37 being divided by the tongues 26 and 27 into respective lap portions 24 and 25 and torso portions extending between the tongues 26 and 27 and the ends 38 and 39. The ends of webs 36 and 37 proximate to the lap portions 24 and 25 illustratively are attached to the restraint assembly anchor points 81 (FIGS. 3, 7 and 12). The fit of the five-point restraint assembly 20 may be adjusted using the web adjusters 28 and 29. The fit may further be adjusted by use of optional and conventional height adjusters 72 and 73 and the optional harness clip 75. Examples, without limitation, of suitable height adjusters are found in commonly owned U.S. Pat. No. 6,886,889, the disclosure of which is herein incorporated by reference. The various web adjusters mentioned throughout the illustrative embodiments illustratively may also be in accordance with and implement the disclosure of the WEB POSITION ADJUSTING DEVICE patent. As explained in U.S. Pat. No. 6,886,889, the height adjusters 72, 73 are movably mounted to and configured to associate restraint webs 36 and 37 and respective mounting webs 42 and 43. Adjuster 72, which may for example be of a conventional 3-bar construction, slides up and own the lengths of web 42 and web 36 in order to increase or decrease the operative length of web 36 and thereby properly size the restraint assembly 20 about the shoulders of the passenger or occupant 19. Similarly, adjuster 73 slides up and down the lengths of web 43 and web 37 in order to increase or decrease the operative length of web 37 and thereby properly size the restraint assembly 20 about the shoulders of the occupant 19. It will be appreciated that cross-member 59 illustratively would set the upper limit of movement of the adjusters 72, 73, while the shoulders of the occupant 19 generally would set the lower limit of movement, provided that the occupant's shoulders are higher than the optional chest strap 32 and/or connecting member 44, which would otherwise set the lower limit of movement. Of course, in order to accommodate taller occupants, the cross-member 59 could be placed further up on the mounting webs 42, 43, or as noted, could be removed altogether if desired. Examples, without limitation, of suitable harness clips are found in commonly owned U.S. Pat. Nos. 5,839,793 and 5,873,635, both of the disclosures of which are now incorporated herein by reference.

As another option, the restraint assembly 20 may be equipped with the aforementioned chest web or strap 32 or other suitable flexible or semi-flexible member. One end of the optional chest web 32 may be attached directly to either over web 42 or over web 43, with the opposing end of web 32 being coupled to a tongue 33, or a buckle 34, configured to mate with a corresponding buckle or tongue attached to the other over web 42 or 43 as the case may be. In the alternative, as seen in FIGS. 1 and 3, each opposing end of chest web 32 may be equipped with either a buckle or a tongue, or one end could have a tongue and the other end a buckle, which is configured to mate with a buckle or tongue, as the case may be, attached to the respective over web 42, 43. Illustratively, a web adjuster may be included on one or both ends of the chest web 32 to adjust the operable length and fit of the chest web 32 about an occupant 19. The chest web 32 may be eliminated (FIG. 10) or may underlie (FIGS. 1 and 10) or overlie (FIGS. 3 and 10) the shoulder webs 36 and 37 as desired in any of the illustrative embodiments.

Figure 9:
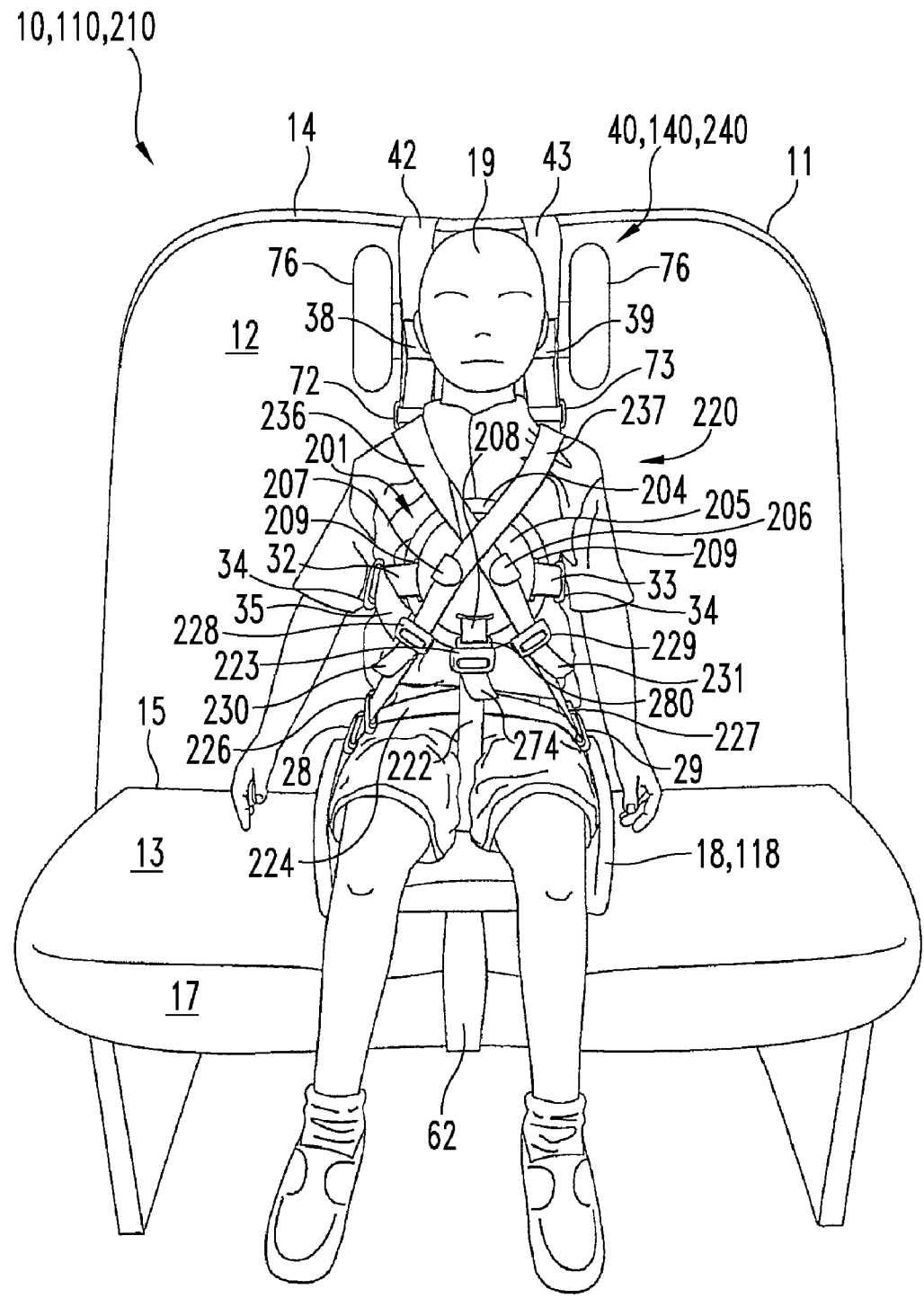
FIG. 9 is a front view of a seat having another exemplary embodiment of an illustrative restraint system mounted thereto.

The embodiment of FIG. 9 comprises another illustrative restraint assembly 220 that may provide additional support for an occupant, including without limitation a special needs passenger. Restraint assembly 220 illustratively is configured for use with any of vehicle restraint systems 10, 110, 210, 310 and generally comprises a torso or chest support assembly 201, a connecting member 222, and two lengths 236 and 237 of any suitable flexible or semi-flexible material such as for example without limitation a web, belt, rope, strap, and the like, having respective first ends 230 and 231 and respective opposing second ends 38 and 39. Second end 38 is attached to over web 42 and second end 39 is attached to over web 43 by any suitable means, such as for example without limitation by stitching, tape, hook and loop, cement, glue, melting, snaps, buttons, zippers, tacks and the like. A cross-member 59 (FIG. 3), as described above, may extend between over webs 42 and 43 and may be attached thereto and to webs 236 and 237 over or adjacent to ends 38 and 39. Other cross-members (not shown) may be spaced apart along the lengths of over webs 42 and 43 to further associate over webs 42 and 43. Opposing end 231 illustratively is threaded through tongue 227 and one or more web adjusters, such as for example and without limitation web adjuster 229. In any event, tongue 227 is configured to engage with a conventional buckle and or combination buckle/adjuster 29 attached to the base 18, 318 at for example anchor point 81 (FIGS. 7 and 12) to releasably lock or secure the length of web 236 to the booster or base 18, 118, 318. Alternative configurations are also contemplated. For example, and without limitation, tongue 227 could be integrated with a web adjuster to replace web adjuster 229. Illustratively, the opposing end of web 237 opposite to end 39 may be attached to base 18, 118, 318, for example at anchor point 81 (FIGS. 7 and 12) in the vicinity of adjuster 28 in FIG. 9. Alternatively, the opposite end may be attached to an illustrative midbelt web adjuster 228. Another length of web 224 could be attached at one end to the booster base 18, 118, 318 at for example anchor point 81 (FIGS. 7 and 12) in the vicinity of adjuster 28 depicted in FIG. 9, with opposing end 230 threaded through web adjuster 228. In either event, a tongue 226 may be disposed on the web portion between the torso portion 337 and where the opposing end attaches to the base 18, 118, 318; illustratively between the web adjuster 228 and the base attachment. When the tongue 226 engages a buckle or combination adjuster and buckle 28, a lap portion 224 is formed. Illustratively, connecting member 222 is attached at one end to the base 18, 118, 318 for example at anchor point 82 (FIGS. 7 and 12) and is equipped at its opposite end 274 with a web adjuster 223. Connecting member 222 may be any suitable flexible, semi-flexible, rigid, or semi-rigid material. In addition, a central type adjust system could be used, such as for example and without limitation as disclosed in commonly owned and previously incorporated by reference U.S. Pat. No. 4,679,852.

Restraint assembly 220 illustratively further comprises a chest or torso support assembly 201. Torso support assembly 201 generally comprises a chest pad 204 and a web guide member 205. Illustratively, chest pad 204 may be formed of a cushioning material such as for example and without limitation rubber or foam, while the web guide member 205 may be formed of a rigid or semi-rigid metallic, non-metallic or composite material such as for example and without limitation plastic. Illustratively, the chest pad 204 and web guide member 205 have a generally circular shape, although all shapes are contemplated, such as for example triangular, square, rectangular, ovate, octagonal and the like without limitation. It will also be appreciated that the chest pad 204 and web guide member 205 could comprise a single member. In any event, a pair of guide clips 206 and 207 are formed on, and a guide channel 209 is formed through the torso support assembly 201. A web extension member 208, which may be any suitable flexible, semi-flexible, semi-rigid or rigid member, is formed on or attached to the torso support assembly 201 by any suitable means. The extension member 208 is illustratively equipped with a tongue 280 configured to engage combination buckle and web adjuster 223, it being appreciated that the combination buckle/adjuster could just be a buckle 223. It will further be appreciated that the tongue/buckle portion of the tongue 280 and buckle/adjuster 223 combination may be of the quick disconnect type of tongue 280 and buckle 223. Illustratively, chest web or strap 32 or other suitable flexible, semi-flexible or semi-rigid member is threaded through the guide channel 209. One end of the chest web 32 may be associated or coupled directly to either over web 42 or over web 43, with the opposing end of web 32 being coupled to a tongue or a buckle 34, configured to mate with a corresponding buckle or tongue attached to the other web 42 or 43 as the case may be. In another embodiment, as seen in FIGS. 1 and 3, each opposing end of chest web 32 may be equipped with either a buckle or a tongue, or one end could have a tongue and the other end a buckle, which is configured to mate with a buckle or tongue, as the case may be, attached to the respective over web 42, 43. Illustratively, a web adjuster may be included in the buckle/tongue 34 combination on one or both ends of the chest web 32 to adjust the operable length and fit of the chest web 32 about an occupant or passenger 19.

In operation, the chest web 32 is wrapped about the occupant 19 and the tongue/buckle/adjuster 34 operated to lock and adjust the fit of the web 32 about the occupant and to properly position the torso support assembly 201 on the occupant. The shoulder webs 236 and 237 may then be drawn across the occupant or passenger as follows. Web 236 illustratively is drawn across the passenger 19, threaded through guide portion or clip 206, and secured by engaging tongue 227 with its corresponding buckle. The fit of the web 236 may then be adjusted by operation of the web adjuster 229. Similarly, web 337 may be drawn diagonally across the occupant 19 and the tongue 226 engaged with its corresponding buckle as shown and thereby drawing the lap portion 224 across the lap of the occupant 19. The fit of the lap portion 224 and the web 337 may be adjusted with the web adjuster 228 or other suitable web adjuster. It will be appreciated that the lap portion 224 could also be attached at one end to a web retractor. Tongue 280 may be engaged with buckle/adjuster 223, with the adjuster 223 operable to adjust or vary the length of the extension member 222. It will be appreciated that the above sequence is illustrative only, such that any of the webs 32, 236, 237, 222 and their associated tongue/buckle connections may be made in any desired order. Moreover, the webs 236 and 237 could be threaded under the guide members or clips 206 and 207 after the tongue 226, 227 and buckle engagement are made. The fit of the restraint assembly 220 may be further adjusted, at any desired time, by use of optional and conventional height adjusters 72 and 73 as described herein above. The restraint assembly 220 may be configured for use with any of the mounting assemblies 40, 140, 240, 340 and systems 10, 110, 210, 310 and variations thereof described herein.

Figure 14:
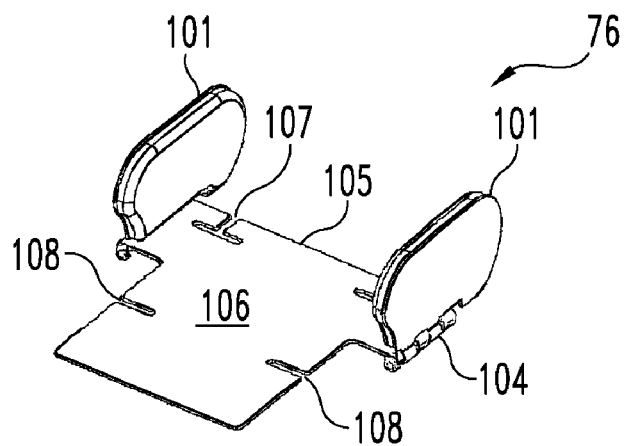
FIG. 14 depicts another illustrative cover for use with any of the illustrative embodiments and having another illustrative lateral support assembly in a deployed position.
Figure 15:
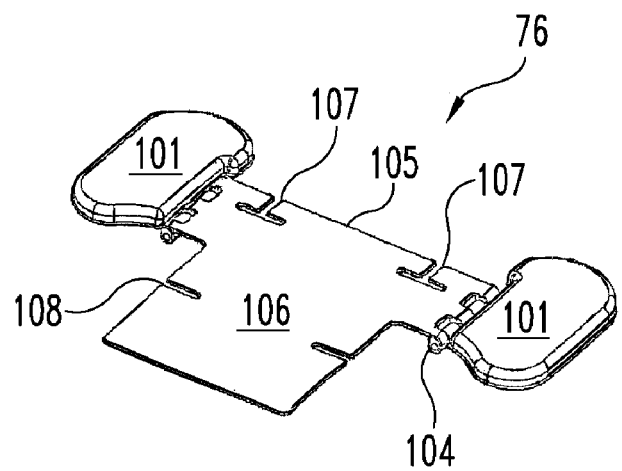
FIG. 15 depicts the illustrative cover of FIG. 14 with the lateral support assembly in a stowed position.
Figure 16:
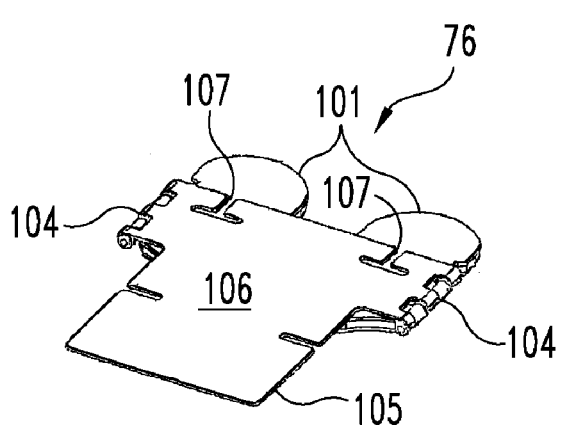
FIG. 16 depicts the illustrative cover of FIG. 14 with the lateral support assembly in an intermediate position between the stowed and the deployed positions.
Figure 17:
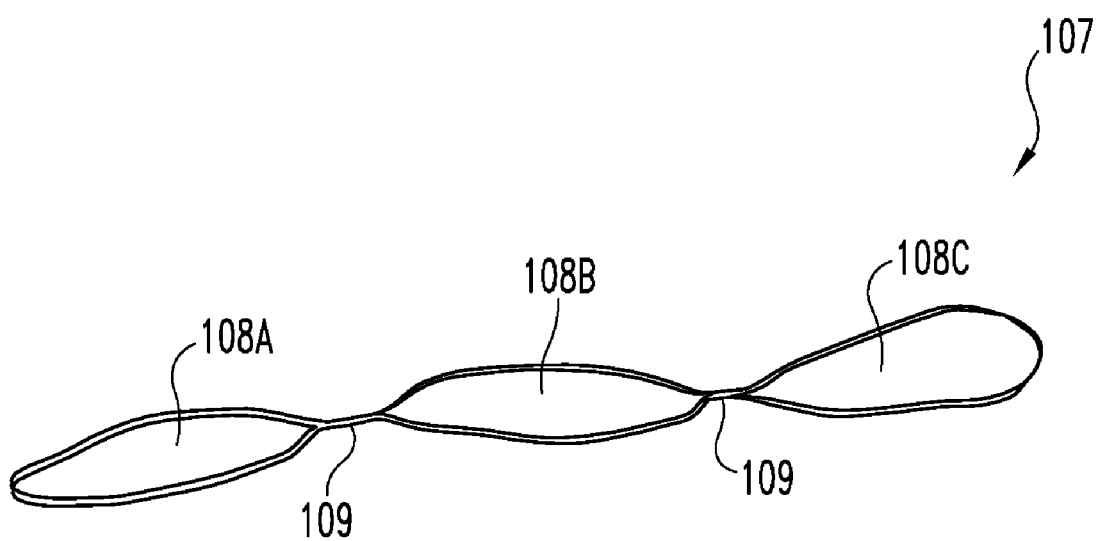
FIG. 17 depicts an illustrative positioning piece for use with any of the illustrative embodiments.

Also depicted in FIG. 9 is an illustrative lateral support assembly 76. As best seen in FIGS. 14-16, lateral support assembly 76 illustratively comprises a pair of spaced apart wings 101 movably coupled to a mounting member 105 having a front facing-surface 106, a pair of spaced-apart upper mounting slots 107, a pair of spaced-apart lower mounting slots 108. The wings 101 may have suitable cushioning over a suitable rigid or semi-rigid support structure (not shown). The support structure, and the mounting member 105 for example and without limitation may be formed from any suitable rigid or semi-rigid, metallic, non-metallic or composite material such as plastic or the like. The cushioning may be foam, rubber or other suitable material and may be covered by cloth or other suitable material if desired. The support assembly 76 may be removable and adjustable. For example, the support assembly 76 could be mounted to the seat 11 or to appropriate portions of the mounting assemblies 40, 140, 240, 340 and/or restraint assemblies 20, 220. For example and without limitation the over webs 42, 43 may be threaded through the respective mounting slots 107, 108 of illustrative mounting member 105. The webs 42, 43 could be threaded upwardly (relative to the page of FIG. 14) through slots 108 and proceed across front-facing surface 106 and downwardly through slots 107; or, they could be thread downwardly through slots 108 and along the back-facing surface opposite to surface 106 and upwardly through slots 107. It is unimportant how or in what order the webs 42, 43 are threaded through the slots 107, 108. In addition, the support assembly 76 can be mounted to other webs, for example and without limitation, to webs 41, 44, and/or 59, alone or in combination with each other or with webs 42, 43. Additional mounting slots could be formed in the mounting member 105 to accommodate mounting via these other webs. The support assembly 76 could also be mounted by other suitable methods, alone or in combination with each other or with the mounting slots 107, 108, such as by for example hook and loops, snaps, zippers or by any other suitable method or structure. For example and without limitation the support assembly could be attached to the webs 42, 43, or even to the seat back portion 12 by hook and loops or the like. No matter whether mounting member 105 or one or more of the other suitable methods/structures for mounting is used, it is contemplated, that the support assembly 76 may be positioned up and down the length of the occupant from the occupant's head down to just above the base 18, 118, 318. In addition, multiple support assemblies 76 could be accommodated. So, for example, one support assembly 76 could be positioned about the occupant's head, and another support assembly 76 simultaneously may be positioned under the occupant's arms. Or, as depicted, a single assembly 76 may be positioned about the occupant's 19 head. The wings 101 are movably attached to the mounting member 105, or other suitable structure, by illustrative hinges 104. The hinges are configured with sufficient tension to allow the wings to be moved to a desired position without the need to actuate any type of release mechanism and generally retained in that position without the need to engage any type of locking mechanism. If desired, however, any suitable locking and/or release mechanism may be used. As best seen in FIGS. 14-16, the illustrative wings 101 may be positioned and moved between a position generally parallel and adjacent to front-facing surface 106 (not shown), a position generally perpendicular to mounting member 105 (FIG. 9 and 14), a position generally parallel and co-planar with mounting member 105 (FIG. 15), a position generally parallel and adjacent to the surface opposite front-facing surface 106 (FIG. 16), and any intermediate positions therebetween.

It will be appreciated that the booster seats 18, 118, 318 may be equipped with a lap belt system alone in lieu of any of the restraint assemblies 20, 220 to restrain the occupant(s) 19. Furthermore, the booster seats 18, 118, 318 could be equipped with just a lap belt for use in combination with the chest web 32 alone or with the chest web and torso support assembly 201 alone. Those skilled in the art will further appreciate that the tongues 26 and 27 in restraint assembly 20 could be replaced by a single tongue configuration known to those skilled in the art. It will also be appreciated that the booster seat 18, 118, 318 could be equipped with a retractor mechanism such as for example and without limitation any automatic locking retractor, which could then be integrated with the restraint system 20, 220. Indeed, any conventional restraint system may be configured for use with the mounting assembly 40, 140, 240, 340 and booster seat 18, 118, 318 combinations.

Figure 8:
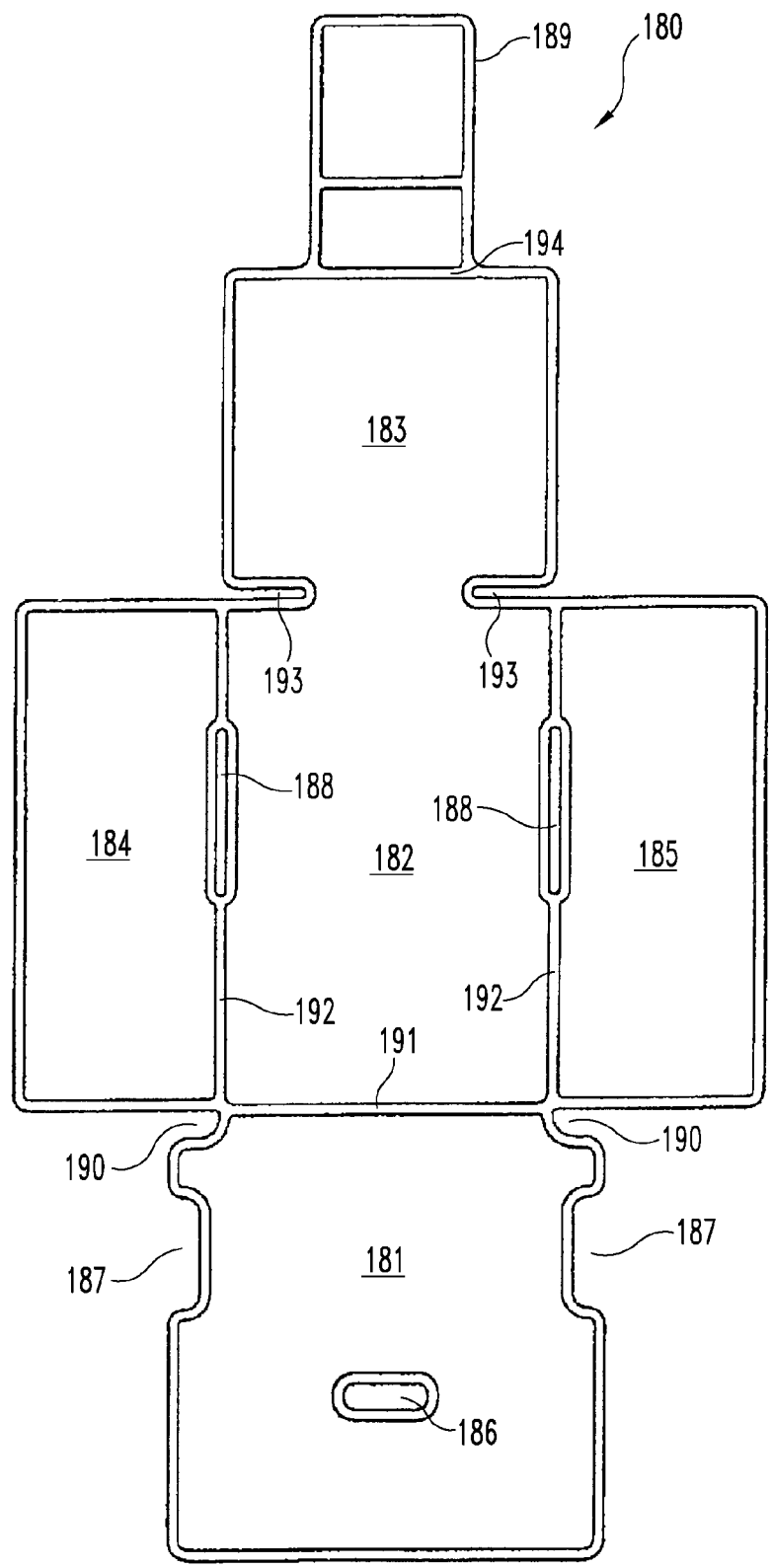
FIG. 8 is a plan view of an illustrative cover for use with any of the illustrative embodiments.

Referring to FIG. 8, an example of an illustrative cover and/or cushion 180 is depicted. The optional cover 180 generally comprises a plurality of panels or sections. For example, an illustrative cover may comprise a seat panel 181, a front panel 182, one or more back panels 184, 185, a head panel 183, and a securing tab 189. The cover 180 may further define a crotch slot 186, restraint belt indentations 187, chest strap slits 188, mounting indentations 190, and shoulder strap indentations 193. Creases or hinges 191, 192, and 194 are provided between the panels. In operation, seat panel 181 may be laid on the upward facing surface of the booster seat 18, then folded approximately 90 degrees at crease 191 so that front panel 182 and head panel 183 lie generally perpendicular to seat panel 181 adjacent the webs 41, 42, and/or 43. Back panels 184, 185 fold at creases 192 and wrap around the webs 41, 42, and/or 43 until the back panels are generally behind the opposite front panel 182 such that the webs 41, 42, and/or 43 are sandwiched between the front panel 182 and the back panels 184, 185. It will be appreciated that the back panels 184 and 185 may overlap each other in whole or in part, or may lie adjacent to each other in side-by-side relation. The webs 42 and 43 will be further sandwiched between the head panel 183 and the seat back 12. The connecting member 22 may be routed through slot 186, the web lap portions 24, 25 may be routed through the indentations 187, the optional chest strap 32 may be routed through the slits 188, and the shoulder straps 36, 37 may be routed through the indentations 193 and then wrapped around and engaged about a passenger 19 as described above. Mounting indentations 190 allow access to the connectors 68 and/or to mounting assembly anchor points 86. Securing panel or tab 189 folds back and around cross member 59 sandwiching the cross member 59 between tab 189 and head panel 183. The cover 180 may be held in place by any suitable method to include without limitation hook and loops, snaps, clasps, zippers, buttons, ties, and the like. The cover 180 may be fashioned out of any suitable natural, synthetic or composite material, such as for example and without limitation, leather, cotton, nylon, spandex, plastic, wool and the like and may contain any natural or synthetic cushioning such as latex, rubber, foam and the like. In addition, the cover 180 could incorporate rigid or semi-rigid materials, whether natural or synthetic, to provide further support if desired. It will be appreciated that the cover 180 may be fitted to any of the illustrative embodiments 10, 110, 210, 310 described and depicted herein. In addition, the support assembly 76 optionally may be mounted to the outside of cover 180 or mounted inside the cover 180 as desired and generally as described above.

Just as restraint system 310 may be mounted to a seat 11 using any one or combination of mounting assemblies 40, 110, 140, 240 described herein, so too any one or combination of the restraint assemblies 20, 220 and variations thereof or other restraint devices and methods described herein, may be used in restraint system 310. Illustratively, for example, FIG. 10 shows three variations of the over webs, chest webs, and mounting webs. So too, FIG. 10 could have depicted one or more of the positions 96A-C with restraint assembly 220. It will be appreciated, that a uniform version is also contemplated, for example each occupant position 96A-C may be equipped with restraint assembly 20, or with restraint assembly 220 and each with the same configuration of over webs, chest webs, and mounting webs.

While the invention has been illustrated and described in detail in the drawings and foregoing description, the same is to be considered as illustrative and not restrictive in character, it being understood that only illustrative embodiments have been shown and described and that all changes and modifications that come within the spirit of the invention are desired to be protected.

The invention claimed is:

1. A restraint system for restraining a passenger in a vehicle seat having a vehicle seat portion and a vehicle back portion defining a bight therebetween, the back portion having a forward facing side and a rearward facing side, the restraint system comprising:

a portable seat base configured to be positioned on the seat portion of the vehicle seat and to support the passenger in a seated position thereon while the passenger is supported by a back portion of the vehicle seat, a mounting assembly coupled to the seat base and configured to mount to the vehicle seat, said mounting assembly having a first mounting strip with a first mounting portion and a second mounting portion, said first mounting portion of said first mounting strip secured to said seat base with said mounting assembly extendable from said first mounting portion upwardly in front of a forward facing side of the vehicle back portion and then over said vehicle back portion to secure said seat base to the vehicle seat; and, a restraint assembly coupled to the seat base and to the mounting assembly, the restraint assembly configured to restrain the passenger positioned on the seat base, said restraint assembly having a pair of restraint straps with top restraint portions and bottom restraint portions and further having a crotch strap extending upwardly from said seat base with a crotch connector secured thereto, said restraint straps having strap connectors between said top restraint portions and said bottom restraint portions that are releasably lockable with said crotch connector; and, wherein said bottom restraint portions of said restraint straps are connected to said seat base with said restraint straps extending upwardly to said top restraint portions which are coupled to said mounting assembly, said mounting assembly extendable upwardly from said seat base on the forward facing side of said vehicle back portion to an in-use position but said mounting assembly and said restraint assembly are flexible enabling collapsing of said mounting assembly and said restraint assembly adjacent said seat base when in a stored condition.

2. The restraint system of claim 1 wherein:

said mounting assembly has a second mounting strip, said first mounting strip and said second mounting strip have first ends and second ends, said first ends are secured to said seat base with said first mounting strip and said second mounting strip extendable from said first ends upwardly in front of the forward facing side of the vehicle back portion and then over and down the rearward facing side of the vehicle back portion to said second ends securing said seat base to the vehicle seat, and;

said top restraint portions of said restraint straps are fixedly attached to said first and second mounting strips between said first ends and said second ends.

3. The restraint system of claim 2 and further comprising:

a pair of bight straps attached to said seat base and then extendable through said bight between said vehicle seat portion and said vehicle back portion and being releasably attached to said second ends of said first and second mounting strips; and, an extension strap attached to said first mounting strip and said second mounting strip and extendable down on said rearwardly facing side of said vehicle back portion and then under said vehicle seat portion being attached to said seat base cooperatively with said bight straps securing said seat base to said vehicle seat.

4. The restraint system of claim 3 and further comprising:

height adjusters slidably mounted to said mounting assembly and to said pair of restraint straps between said top restraint portions and bottom restraint portions of said restraint straps to position said restraint straps against the passenger.

5. A safety restraint system for mounting a child to a vehicle seat which has a vehicle back portion and a vehicle seat portion with a seat bight located therebetween, said vehicle back portion including a forwardly facing side and a rearwardly facing side and comprising:

a child seat restable atop said vehicle seat, said child seat includes a base positionable atop and on said vehicle seat portion of said vehicle seat, said base supporting a child thereatop while the child is supported by said vehicle back portion of said vehicle seat;

a mounting assembly connected to said child seat having a first mounting portion and a second mounting portion, said first mounting portion extendable upwardly on a forwardly facing side of said vehicle back portion and then downwardly on said rearwardly facing side of said vehicle back portion, said first mounting portion and said second mounting portion having adjacent ends in contact with each other being releasably connected together to secure said child seat to said vehicle seat; and, a restraint assembly connected to said child seat to secure a child thereto, said restraint assembly having a pair of restraint straps with top portions and bottom portions, said restraint assembly further having a crotch strap extending upwardly from said base, said crotch strap having a top end with a crotch connector secured thereto, said restraint straps having strap connectors between said top portions and said bottom portions that are releasably lockable with said crotch connector to secure the child to said child seat, and wherein:

said mounting assembly has a mounting strap, said restraint straps extend upwardly from said base with said top portions connected to said mounting strap, said mounting assembly extendable upwardly from said base adjacent said vehicle back portion to an in-use position, said mounting assembly and said restraint assembly are flexible and once said adjacent ends are unconnected with each other enables collapsing of said mounting assembly and said restraint assembly from extending upwardly to adjacent said child seat when in a stored condition.

6. The safety restraint system of claim 5 wherein:

said mounting assembly further has an additional mounting strap which has a first end and an opposite end, said additional mounting strap extends from said first end connected to said mounting strap and then adjacent and beneath said vehicle seat portion to said opposite end and secured to said child seat.

7. A safety restraint system for mounting a child to a vehicle seat which has a vehicle back portion and a vehicle seat portion with a seat bight located therebetween, said vehicle back portion including a forwardly facing side and a rearwardly facing side and comprising:

a child seat restable atop said vehicle seat, said child seat includes a base positionable atop and on said vehicle seat portion of said vehicle seat, said base supporting a child thereatop while the child is supported by said vehicle back portion of said vehicle seat;

a mounting assembly including a mounting strap connected to said child seat, said mounting assembly having a first mounting portion extendable upwardly on a forwardly facing side of said vehicle back portion and a second mounting portion extending downwardly on said rearwardly facing side of said vehicle back portion with said first mounting portion and said second mounting portion having adjacent portions in contact with each other being connected together to secure said child seat to said vehicle seat; and, a restraint assembly connected to said child seat to secure a child thereto, said restraint assembly having a pair of restraint straps with top portions and bottom portions, said restraint assembly further having a crotch strap extending upwardly from said base, said crotch strap having a top end with a crotch connector secured thereto, said restraint straps having strap connectors between said top portions and said bottom portions that are releasably lockable with said crotch connector to secure the child to said child seat, and wherein:

said restraint straps extend upwardly from said base with said top portions connected to said mounting strap, said mounting assembly extendable upwardly from said base adjacent said vehicle back portion to an in-use position, said mounting assembly and said restraint assembly are flexible and enables collapsing of said mounting assembly and said restraint assembly from extending upwardly to adjacent said child seat when in a stored condition; and wherein said vehicle seat includes anchorages and further, comprising:

a pair of anchorage connectors attached to said child seat and lockingly engageable with said anchorages disposed in said seat bight of said vehicle seat securing said child seat thereto; and wherein said second mounting portion is connected to said vehicle seat securing said child seat to the vehicle seat.

8. A safety restraint system for mounting a child to a vehicle seat which has a vehicle back portion and a vehicle seat portion comprising:

a child seat restable atop said vehicle seat, said child seat providing a base positionable atop and on said vehicle seat portion of said vehicle seat, said base supporting a child thereatop;

a mounting assembly having a first mounting portion and a second mounting portion, said mounting assembly extendable upwardly and then over and down said vehicle back portion of said vehicle seat while connected to said child seat to secure said child seat to said vehicle seat; and, a restraint assembly connected to said child seat to secure a child thereto, said restraint assembly having a restraint strap with a top end and a bottom portion, said restraint assembly further having a crotch strap extending upwardly from said base and having a crotch connector secured thereto, said restraint strap having a restraint connector between said top end and said bottom portion that is releasably lockable with said crotch connector to secure the child to said child seat, and wherein:

said mounting assembly has a mounting strap with said top end of said restraint strap connected to said mounting strap, said restraint assembly and said mounting assembly extendable upwardly from said base to an in-use position but are flexible enabling collapsing of said restraint assembly and said mounting assembly adjacent said child seat when in a stored condition.

9. A child restraint for mounting to a vehicle seat that has a vehicle back portion and a vehicle seat portion comprising:

a child seat restable atop and on said vehicle seat portion of said vehicle seat;

a mounting strap assembly having a mounting strap with said assembly attached to said child seat and extendable upwardly and downwardly around said vehicle back portion to releasably hold said child seat to said vehicle back portion of said vehicle seat;

a crotch strap secured to said child seat and having a crotch connector;

restraint strap portions each with top ends and lower portions, said top ends of said strap portions being coupled to said mounting strap and having strap connectors in between said top ends and said lower portions, said crotch connector and said strap connectors releasably connectable together to secure a child to said child seat; and, said mounting strap assembly and said restraint strap portions extending upwardly along said vehicle back portion when in use but are collapsible downwardly to said child seat when in a stored position.

* * * * *